(12) United States Patent
Bornemann et al.

(10) Patent No.: US 7,760,941 B2
(45) Date of Patent: Jul. 20, 2010

(54) METHOD AND APPARATUS OF SEGMENTING AN OBJECT IN A DATA SET AND OF DETERMINATION OF THE VOLUME OF SEGMENTED OBJECT

(75) Inventors: Lars Bornemann, Bremen (DE); Volker Dicken, Bremen (DE); Jan-Martin Kuhnigk, Bremen (DE)

(73) Assignee: MeVis Research GmbH, Bremen (DE)

( * ) Notice: Subject to any disclaimer, the term of this patent is extended or adjusted under 35 U.S.C. 154(b) by 973 days.

(21) Appl. No.: 11/503,337

(22) Filed: Aug. 11, 2006

(65) Prior Publication Data

US 2007/0217668 A1      Sep. 20, 2007

Related U.S. Application Data

(60) Provisional application No. 60/720,073, filed on Sep. 23, 2005.

(51) Int. Cl.
  *G06K 9/00*    (2006.01)
  *G06K 9/42*    (2006.01)
  *G06K 9/34*    (2006.01)

(52) U.S. Cl. .................. 382/173; 382/257; 382/132

(58) Field of Classification Search .......... 382/128, 382/131, 132, 154, 164, 172, 173, 254, 256, 382/257, 267, 268, 270, 276, 277; 600/407, 600/425; 378/37, 62
See application file for complete search history.

(56) References Cited

U.S. PATENT DOCUMENTS

| | | | | |
|---|---|---|---|---|
| 6,112,112 | A * | 8/2000 | Gilhuijs et al. | 600/425 |
| 6,272,366 | B1 * | 8/2001 | Vining | 600/407 |
| 6,813,374 | B1 * | 11/2004 | Karimi et al. | 382/131 |
| 7,203,354 | B2 * | 4/2007 | Wilson et al. | 382/131 |
| 7,274,810 | B2 * | 9/2007 | Reeves et al. | 382/128 |
| 7,379,062 | B2 * | 5/2008 | Poole | 345/424 |
| 7,486,812 | B2 * | 2/2009 | Gurcan et al. | 382/131 |
| 2005/0163358 | A1 * | 7/2005 | Moeller | 382/128 |
| 2005/0228250 | A1 * | 10/2005 | Bitter et al. | 600/407 |
| 2006/0159328 | A1 * | 7/2006 | Vaz et al. | 382/131 |
| 2007/0217668 | A1 * | 9/2007 | Bornemann et al. | 382/132 |

* cited by examiner

*Primary Examiner*—Amir Alavi
(74) *Attorney, Agent, or Firm*—Neil A. Steinberg

(57) ABSTRACT

The invention relates to a method of segmenting an object in a data set, wherein the object is initially segmented resulting in a first set ($N_0$) of voxels. An erosion operation is performed on the first set ($N_0$) of voxels resulting in an eroded set ($N_-$) of voxels. A dilation operation is performed on the eroded set ($N_-$) of voxels resulting in a dilated set ($N_+$) of voxels. The erosion operation depends on a variable erosion threshold ($\Theta_-$), and the dilation operation depends on a variable dilation threshold ($\Theta_+$).

40 Claims, 9 Drawing Sheets

METHOD AND APPARATUS OF SEGMENTING AN OBJECT IN A DATA SET AND OF DETERMINATION OF THE VOLUME OF SEGMENTED OBJECT

RELATED APPLICATIONS

This application claims priority to U.S. Provisional Application Ser. No. 60/720,073, entitled "Method for Segmentation and Volume Analysis of Tumors and Metastases", filed Sep. 23, 2005. The contents of this provisional application are incorporated by reference herein in its entirety.

TECHNICAL FIELD

The invention relates to a method, an apparatus and a computer program of segmenting an object in a data set. The invention relates further to a method, an apparatus and a computer program of determination of the volume of a segmented object. In addition, the invention relates to a method, an apparatus and a computer program of segmenting an object in a data set and of determination of the volume of a segmented object.

BACKGROUND

The segmentation of an object and the determination of the volume of a segmented object are particularly important in the diagnosis and treatment of cancer, for example, of lung cancer.

Since the entire cardiac output flows through the lungs, the risk of hematogenous lung metastases is very high. Apart from primary lung cancer, the most common tumors metastasizing in the lungs are breast cancer, gastrointestinal tumors, kidney cancer, melanoma, sarcomas, lymphomas, leukemias, and germ cell tumors. Because of the systemic character of the disease, chemotherapy is the standard treatment for lung metastases. To assess the effect of chemotherapy, a follow-up examination is performed typically three to six months after the start of the treatment. Tumor growth is one of the standard decision parameters for therapy success.

Lung cancer, i.e. the primary bronchial carcinoma, is the leading cause of cancer death, and early detection is crucial to the chance for curative treatment. However, early stage lung cancer patients are usually asymptomatic. To allow sufficiently early detection, efforts are under way to establish lung cancer screening using multi-detector CT for populations at risk such as smokers, or asbestos exposed coal mine workers. A major problem with lung cancer screening is that small nodules are detected in the majority of subjects, which are benign in most cases. Again, nodule growth is the standard parameter for the discrimination between benign and malignant nodules. A follow-up scan is performed for patients with suspicious lesions typically three to six month later. Exact growth assessment is crucial for correct classification, allowing for more reliable detection of malignancy.

Since most nodules grow irregularly in three dimensions, the assessment of nodule growth requires three-dimensional measurements. Only with the advent of multi-detector CT scanners it became possible to scan the thorax in an approximately isotropic three-dimensional resolution without significant breathing artifacts. But even on current high resolution scans, accurate volume assessment is virtually impossible for the radiologist without substantial computer assistance. Hence, axial diameters were traditionally used for estimation of volumetric nodule growth. For example, in the context of therapy monitoring, current standard criteria (for example RECIST, published in "New guidelines to evaluate the response to treatment in solid tumors. European organization for research and treatment of cancer, national cancer institute of the United States, national cancer institute of Canada", P. Therasse et al., J. Natl. Cancer Inst., vol. 92, no. 3, pp. 205-216, February 2000) require the radiologist to locate the five largest tumors in the lung and find the axial slice where the tumor appears largest in order to manually measure the greatest nodule diameter. Strength and weaknesses of the RECIST method in face of emerging volumetric quantification methods are discussed elaborately in "Evaluation of the response to treatment of solid tumours—a consensus statement of the international cancer imaging society", J. E. Husband et al., British J. of Cancer, vol. 90, pp. 2256-2260, May 2004. Even if measuring errors are neglected, these two-dimensional criteria are reliable only for spherical nodules and unsuited for irregularly shaped nodules. Additionally, manually finding the correct slice and measuring two-dimensional diameters for each of possibly many nodules not only leads to reproducibility issues but is also time consuming. In order to assess nodule growth quickly and reliably, computer assistance in volume measurements is desirable.

Known segmentation methods have often the drawback that they cannot segment high-density objects which are connected to other high-density structures. For example, solid pulmonary lesions generally show a high density contrast to the surrounding lung parenchyma in CT scans. The major difficulty in three-dimensional segmentation of lung lesions is that most nodules are directly connected to other high density structures. Even in contrast enhanced CT scans, it is in most cases impossible to separate a lesion from connected vasculature or the chest wall solely based on density contrast.

Furthermore, known segmentation methods have often the problem that they cannot segment objects of different size with the same quality, i.e. with the same reproducibility and accuracy. This is particularly important in cancer diagnostic and treatment, because lesions discovered during screening of an asymptomatic population are mostly either small benign nodules, or early stage lung cancer. They are generally lesser in size and usually not extensively interconnected with vasculature. In contrast to this, the population of patients undergoing chemotherapy typically suffers from advanced inoperable cancer. Metastatic tumors occur at all stages, so that segmentation algorithms have to deal with the full range of appearances, from small spherical nodules (Ø<10 mm) consisting mostly of partial volume voxels, to large nodules (Ø>40 mm) of irregular morphology. Due to their size, the latter are more likely to be complexly connected to vasculature and chest wall.

In addition, known segmentation methods are computational complex and, therefore, slow. In particular, in the field of cancer diagnostic and treatment the clinical usefulness of a method highly depends on its speed. Especially for larger lesions, the computational performance of a segmentation algorithm is a critical issue, since the volume of interest to be analyzed for, for example, a 40 mm tumor is about 64 times larger than for a 10 mm nodule.

In the following some known methods of segmentation and of determination of the volume of a segmented object will be discussed.

Before modern multi-detector CT scanners were widely available, slice-based approaches were introduced. Xu et al. developed a method which performs dynamic programming on a slice-by-slice basis using manual initialization and shape constraints (published in "Automated lung nodule segmentation using dynamic programming and EM-based classification", N. Xu et al., Proc. SPIE Med. Imag., vol. 4684, 2002, pp. 666-676).

In a method described by Fan et al., a thresholding is followed by an analysis of the nodule's orientation and size, and the adaptation of a three-dimensional template (published in "Automatic segmentation of pulmonary nodules by using dynamic 3d cross-correlation for interactive CAD systems", L. Fan et al., Proc. SPIE Med. Imag., vol. 4684, May 2002, pp. 1362-1369). The method is suitable for small, approximately ellipsoid nodules and requires interactive correction in case of irregularly shaped nodules. However, for nodules attached to the chest wall, an ellipsoid shape is usually not a good approximation.

An approach by Kostis et al. was designed for small pulmonary nodules and uses a semi-automatic classification of the target nodule into one of four nodule models, the most important ones representing solitary, vascularized, and juxtapleural nodules (published in "Three-dimensional segmentation and growth rate estimation of small pulmonary nodules in helical CT images", W. J. Kostis et al., IEEE Trans. Med. Imag., vol. 22, no. 10, pp. 1259-1274, 2003). After an initial segmentation using a fixed threshold, separation from adjacent high density structures is performed by morphological methods. This method is specifically designed for small nodules. Several assumptions are made concerning especially the removal of attached vasculature that are not transferable to objects, for example, lesions, of arbitrary size and morphology.

In "Robust anisotropic gaussian fitting for volumetric characterization of pulmonary nodules in multislice CT", IEEE Trans. Med. Imag., vol. 24, no. 3, pp. 409-423, March 2005, Okada et al. presented an automated method to approximate solid nodules as well as Ground Glass Opacities (GGO) by ellipsoids using anisotropic Gaussian fitting. The volume of the nodule was estimated by the volume of the ellipsoid. While the approach is intriguing due to its applicability to non-solid nodules, the question of volumetric reproducibility for nodules of non-elliptical shape, especially in case shape changes due to irregular nodule growth, is a potential drawback of this ellipsoid approximation approach.

Fetita et al. presented a complete Computer Aided Detection (CAD) system, which also included the segmentation of detected nodules (published in "3d automated lung nodule segmentation in HRCT", C. I Fetita et al., Proc. MICCAI, 2003, pp. 626-634). This system is specifically designed for small nodules and uses initial thresholding followed by morphological methods for segmentation. In contrast to the other approaches discussed here, it can take advantage of global information acquired during the detection procedure which processes the complete lungs. While the global information can considerably help in assessing the local situation more accurately, an analysis of the complete lung implies the analysis of 300 to 500 CT slices and is not suitable for fast, interactive one-click methods unless a preprocessing step was performed earlier. Any dependence on a preprocessing step makes it harder to integrate a method as a plug-in to existing workstations or CAD systems.

After an object has been segmented, it is often required to determine the volume of the segmented object. The process of determining of the volume is called volumetry. A major issue in the volumetry of objects, in particular of small objects, is the so-called partial volume effect. Due to the limited resolution of an imaging device, for example, of a CT scanner a single voxel may represent more than a single part, for example tissue type, at a time, and the measured density is dependent on the individual densities of this part of the object and the volume ratio of this part within the voxel. While the amount of this particular partial volume effect depends primarily on the scanner resolution, additional volume averaging occurs during image reconstruction, which is affected by parameters such as reconstruction kernel and slice thickness.

It is a well-known fact that these averaging effects cause a substantial sensitivity of two-dimensional diameter as well as three-dimensional volume measurements to changes in scanning or reconstruction protocols when derived straight-forward from segmentation results. In particular, in a typical clinical setting this is a significant problem, because it is often not possible to guarantee that a follow-up scan is performed with the same reconstruction and scanning protocol—or even at the same scanner—as the previous scan, which usually dates back between three and 24 months.

In most of the publications of methods of segmentation discussed above, volumetry is given as the primary motivation for segmenting objects, in particular lung nodules. However, the step from segmentation to volume assessment is often not explicitly discussed, implying that by solving the problem of segmentation, the problem of volumetry could be considered solved as well. No evaluation of reproducibility with respect to varying acquisition or reconstruction parameters was performed in any of the publications. Current scientific methods as well as commercial products available for the assessment of lung nodule volume were shown to be associated with significant impairment of reproducibility when acquisition or reconstruction parameters were varied (see, for example, "Small pulmonary nodules: Volume measurement at chest CT—phantom study", J. P. Ko et al., Radiology, vol. 228, no. 3, pp. 864-870, 2003; "Pulmonary metastases: effect of CT section thickness on measurement-initial experience", B. Zhao et al., Radiology, vol. 234, no. 3, pp. 934-939, 2005; and "Volumetric measurement of synthetic lung nodules with multi-detector row cc Effect of various image reconstruction parameters and segmentation thresholds on measurement accuracy", J. M. Goo et al., Radiology, vol. 235, no. 3, pp. 850-856, June 2005).

Volumes are generally extracted by summing up the volume of segmented voxels, which were obtained using a segmentation method that uses thresholding at least in order to generate an initial approximation of the nodule shape. When applied to small objects whose boundaries are subject to volume averaging, the measured volumes will depend highly on its amount. Volume averaging occurs wherever there is a density gradient in the voxels, for example, in CT data, such as between the nodule tissue and the lung parenchyma. Causes for volume averaging are not only the limited physical scanning resolution (the classical partial volume effect), but also the reconstructed resolution (field of view, slice thickness) and the filter algorithm used for reconstruction, which serves as low-pass filtering in order to reduce noise. Whenever any of these parameters is varied, conventional, threshold-based volume assessment will be affected. Volume averaging leads to nodule volume underestimation by threshold based methods. This is mostly due to the compact, mostly convex shape of lung nodules: The average boundary voxel is surrounded by voxels with more parenchyma than nodule tissue. In addition to different averaging strengths, density variations of either nodule (e. g., due to calcification processes or contrast agent) or surrounding parenchyma (e. g., due to different inspiration state) can significantly influence fixed threshold-based volumetry.

First attempts have been made to reduce the impact of the partial volume and reconstruction-based volume averaging effects by supersampling prior to segmentation (published in "Three-dimensional segmentation and growth rate estimation of small pulmonary nodules in helical CT images", W. J. Kostis et al., IEEE Trans. Med. Imag., vol. 22, no. 10, pp. 1259-1274, 2003), by applying compensatory equations to measured volumes (published in "Effect of varying CT section width on volumetric measurement of lung tumors and application of compensatory equations", H. T. Winer-Muram et al., Radiology, vol. 229, no. 1, pp. 184-194, 2003), and by histogram analysis without previous segmentation (published in "Small pulmonary nodules: Volume measurement at chest CT—phantom study", J. P. Ko et al., Radiology, vol. 228, no. 3, pp. 864-870, 2003). These attempts will be discussed in the following. Kostis et al. address in "Three-dimensional segmentation and growth rate estimation of small pulmonary nodules in helical CT images", W. J. Kostis et al., IEEE Trans. Med. Imag., vol. 22, no. 10, pp. 1259-1274, 2003 the partial volume effect. In this publication an upper bound for the error induced by discrete sampling of a perfect circle was computed. It was shown that the volumetric error produced by misclassification of boundary voxels converges against zero with increasing scanner resolution for this setting, an effect, which can be shown in the three-dimensional case as well. However, volume averaging problems cannot be completely overcome by supersampling the data sufficiently. The error bound computations base on an arbitrary sampling of a noiseless, continuous image. This situation describes the scanning process only and neglects the effects of reconstruction. Any postprocessing algorithms are performed on the reconstructed images, and reconstructed images are already quantized. Hence, volume averaging has already taken place, and this loss of information cannot be reversed by supersampling.

An approach for counteracting imaging parameter induced variabilities is to determine compensatory equations for the measured volumes by explicitly incorporating information about the acquisition and reconstruction. Winer-Muram et al. attempted to compensate for volumetric deviations caused by slice thickness variations by performing affine transformations of the measured volumes, which were initially obtained by manual measurements (published in "Effect of varying CT section width on volumetric measurement of lung tumors and application of compensatory equations", H. T. Winer-Muram et al., Radiology, vol. 229, no. 1, pp. 184-194, 2003). But this approach cannot reliably consider all parameters—from the physical scanner resolution to the patient's inspiration state—which can result in measured volume changes for actually unchanged nodules.

Alternatively to fixed threshold approaches, adaptive thresholding (also called variable thresholding) could be used. As part of the study in "Small pulmonary nodules: Volume measurement at chest CT—phantom study", J. P. Ko et al., Radiology, vol. 228, no. 3, pp. 864-870, 2003, Ko et al. compared the reproducibility of fixed and variable thresholding for isolated phantom nodules, showing a significantly better performance of the variable threshold technique. For in vivo nodules, however, finding the correct threshold that leads to accurate and reproducible volumetry prior to segmentation is significantly more difficult. Firstly, in the instant where the threshold needs to be determined, no segmentation is available. Hence, other high density structures within the volume of interest (VOI) and possibly even connected to the nodule (e.g., chest wall, vasculature) cannot be explicitly excluded, influencing threshold determination mechanisms such as Otsu thresholding (published in "A threshold selection method from gray-level histogram", N. Otsu, IEEE Trans. Syst. Sci. Cybernetics, vol. 9, no. 1, pp. 62-66, 1979). Secondly, for small nodules where the reconstructed image does not contain even a single voxel representing pure nodule tissue, the method presented by Ko et al. yields volumetry results of a quality which is not sufficient for medical purposes.

In the above mentioned publication of Ko et al., an application of a partial volume analysis approach in the context of lung nodules was proposed. Using no segmentation and only a reference region within the nodule core manually drawn on a central slice, mean densities of pure nodule tissue and surrounding parenchyma were estimated from the data. The volume was computed for each slice by summing up voxel densities in each slice and weighting them with respect to those pure tissue means. In the publication of Ko et al., the evaluation for solid, isolated phantom nodules showed a reproducibility of their so-called Partial Volume Method that was even superior to the one of the variable thresholding technique. While these studies proved the enormous potential of a more elaborate density analysis on the image data set, for example, on a CT image, their method is not suitable for in vivo nodule assessment, since attached high-density structures would be accounted to the nodule volume. In addition, the extraction of mean attenuations for both nodule and parenchyma needs to be performed fully automatic, and still be robust and reliable and undisturbed by other lung structures present within the VOI.

SUMMARY OF THE INVENTION

It is therefore an object of the invention to provide a method and apparatus of segmentation which is more robust on objects of different size, different density, different morphology and different connections to surrounding structures and on different scan and reconstruction parameters than known methods.

It is a further object of the invention to provide a method and apparatus of segmentation which is faster than known methods.

It is a further object of the invention to provide a method and apparatus of segmentation which can be easily integrated into existing workstations or CAD systems.

These objects are achieved by a method of segmenting an object in a data set, said method comprising the following steps:
a) initial segmenting of the object, in particular by using a region growing method, resulting in a first set of voxels,
b) performing an erosion operation on the first set of voxels resulting in an eroded set of voxels and
c) performing a dilation operation on the eroded set of voxels resulting in a dilated set of voxels,
   wherein the erosion operation depends on a variable erosion threshold and
   wherein the dilation operation depends on a variable dilation threshold.

Because of the use of variable erosion and dilation thresholds, the segmentation can be adapted to yield optimal segmentation results which are optimized for the object which has to be segmented.

It is preferred that the initial segmenting is adapted such that the first set of voxels comprises only connected voxels. The use of a connected set of voxels as first set of voxels further improves the quality of the segmentation.

It is further preferred that the erosion threshold and the dilation threshold depend on the first set of voxels. Since the first set of voxels comprises already information about the shape of the object, which has to be segmented, and since, in an embodiment, the erosion threshold and the dilation threshold depend on the first set of voxels, the erosion threshold and the dilation threshold depend on information about the object, which has to be segmented. The use of such thresholds for the segmentation further improves the quality of the segmentation.

It is preferred that the first set of voxels is modified, before performing the erosion operation, by following steps:
i) determining a complement of the first set of voxels,
ii) performing a connected component analysis on the complement of the first set of voxels resulting in the largest connected non-segmented area,
iii) subtracting the largest connected non-segmented area from the data set resulting in a modified first set of voxels.

Also these steps further improve the quality of the segmentation.

If in a step of a method according to the invention the first set of voxels has been modified and if following steps of a method according to the invention refer to a first set of voxels, this reference refers preferentially to the last modification of the first set of voxels, i.e. the modified first set of voxels comprising the last modifications of the first set of voxels.

It is further preferred that the erosion threshold is determined depending on a first minimal distance of each of at least some voxels of the data set, in particular for the voxels of the first set, wherein the first minimal distance of each of at least some voxels of the data set is the distance of the respective voxel of the at least some voxels of the data set to a voxel outside of the first set having the shortest distance to the respective voxel of the at least some voxels of the data set, and
   wherein the dilation threshold is determined depending on a second minimal distance of each of at least some voxels of the data set, wherein the second minimal distance of each of the at least some voxels of the data set is the distance of each of the at least some voxels of the data set to a voxel of the eroded set of voxels having the shortest distance to the respective voxel of the at least some voxels of the data set.

The use of first and second minimal distances of the voxels of the data set to determine the erosion and dilation thresholds further improves the determination of these thresholds, and, therefore, the segmentation of the object.

It is preferred that the erosion threshold is determined by
   performing a first distance transformation to determine for each of at least some voxels of the data set the first minimal distance resulting in a first distance map,
   determining a seed point in the first set of voxels being the position of a maximum, in particular a local maximum, in the first distance map,
   determining the erosion threshold by performing a variable threshold region growing on the first distance map starting from the determined seed point wherein the erosion threshold is equal to or larger than the highest threshold sufficient to reach the boundaries of the data set.

These steps further improve the determination of the erosion threshold, thereby improving the segmentation.

It is further preferred that the erosion operation is performed such that the eroded set of voxels comprises all voxels of the first set of voxels whose first minimal distance is greater than or equal to the erosion threshold. This yields an eroded set of voxels which further improves the quality of segmentation.

It is further preferred that, if the eroded set of voxels comprises different voxel sets, which are separated from each other, one of these different voxel sets is selected by connected component analysis as the eroded set of voxels, with which further steps are carried out. The connected component analysis can be carried out by selecting the voxel set of the different sets of voxels which is located at the actual seed point, wherein the actual seed point is preferentially located at a local maximum in the first distance map. Also this further improves the quality of the segmentation.

It is preferred that the dilation threshold is determined such that the dilated set of voxels comprises the same or more voxels than the first set of voxels and/or that the dilation threshold is equal to or larger than the erosion threshold. Also this further improves the quality of the segmentation.

It is further preferred that the dilation operation comprises the following steps:
   performing a second distance transformation to determine for each of at least some voxels of the data set the second minimal distance resulting in a second distance map,
   performing the dilation procedure such that the dilated set of voxels includes all voxels whose second minimal distance to voxels of the eroded set of voxels is smaller than the dilation threshold.

Also this further improves the quality of the segmentation.

It is preferred that, after the dilation operation, following steps are performed:
   determining the intersection of the boundary of the dilated set of voxels with the first set of voxels resulting in an intersected set of voxels,
   dilating the intersection by a tolerance summand resulting in a dilated intersected set of voxels,
   subtracting the dilated intersected set of voxels from the dilated set of voxels.

These steps remove small structures attached to the object which has to be segmented from the segmentation, for example, vessels which are connected to a nodule, which has to be segmented. This further improves the quality of the segmentation.

It is preferred that, if the dilated set of voxels is surrounded by a rim of voxels, wherein the absolute difference between voxel values of the rim of voxels and voxel values of voxels of the dilated set of voxels located in the vicinity of the rim of voxels is larger than a predetermined difference value, the voxel values of the rim are set to a value having a absolute difference to the voxel values of the dilated set of voxels located in the vicinity of the rim which is smaller than the predetermined difference value. This improves the segmentation of an object having a surrounding rim which has voxel values which differ significantly from the inner voxel values of the object.

It is preferred that, if the dilation threshold is larger than the erosion threshold, the tolerance summand is equal to the difference between the dilation threshold and the erosion threshold. This improves the removal of small structures which are attached to the object in the segmentation.

It is further preferred that, before the erosion operation and after step iii), following steps are performed:
   performing a convex hull operation on the largest connected non-segmented area resulting in a convex set of voxels,
   modifying the first set of voxels by intersecting the first set of voxels with the convex set of voxels wherein the intersection is the modified first set of voxels.

The convex hull operation is particularly useful to separate convex parts of the object from a large substantially plane structure which is connected to the object, in particular, to separate a chest wall, which is connected to a nodule, which has to be segmented, from this nodule.

It is preferred that step a) comprises following steps:
   providing a volume of interest inside the data set,
   determining an object value from values in the center of the volume of interest, determining a non-object value from the value of the volume of interest or providing a predetermined non-object value, determining lower and upper thresholds depending on a relation between the object value and the non-object value, performing a region growing procedure starting from a predetermined seed point with the determined lower and upper thresholds resulting in a first set of voxels.

With these steps a first set of voxels can be determined, which yields a segmentation of further improved quality, even if the density of different objects, which have to be segmented, differs significantly. Thus, by using these steps the robustness against objects having significantly different densities is improved.

It is preferred that the object value is an average value of values located in the center. It is further preferred that the non-object value is determined as the value within the volume of interest comprising the largest frequency of occurrence. By using these values the robustness against objects having significantly different densities is further improved.

It is further preferred that the lower and upper thresholds are determined such that the lower threshold is the smallest voxel value within the volume of interest and the upper threshold is the average of the object value and the non-object value, if the object value is smaller than all values within a predetermined interval surrounding the non-object value, the lower threshold is the average of the object value and the non-object value and the upper threshold is the largest voxel value within the volume of interest, if the object value is larger than all values within a predetermined interval surrounding the non-object value, the lower threshold and the upper threshold within a margin around the non-object value, wherein the margin is determined such that less than a predetermined fraction of the volume of interest is located within the margin, if the object value is located within the predetermined interval surrounding the non-object value.

These steps further improve robustness against objects having significantly different densities, and therefore the quality of the segmentation.

It is preferred that, before the step of performing an initial segmentation of the object in step a), an initial segmentation of the object is performed, in particular by using a region growing method resulting in an initial set of voxels, a first neighboring set of voxels is defined, wherein the voxels of the initial set of voxels are located within a first predetermined voxel distance from the initial set of voxels, a second neighboring set of voxels is defined, wherein the voxels of the second neighboring set of voxels are located within a second predetermined voxel distance from the first neighboring set of voxels, if the difference between a first average of the voxels of the first neighboring set of voxels and an second average of the second neighboring set of voxels is larger than a predetermined first fraction of the first average and if the first average is larger than a third average of the initial set of voxels and if the first average is larger than the second average, to each of the voxels of the initial set of voxels a value is assigned such that a predetermined second fraction of voxel values of the first neighboring set of voxels is smaller than the assigned value of the voxels of the first set of voxels, wherein the values within the volume of interest are modified.

The first, second and third averages are preferentially median values. The first fraction is preferentially 0.1, and the second fraction is preferentially 0.95, i.e. the 95% quantile. The first predetermined voxel distance is preferentially two, i.e. the first neighboring set of voxels comprises preferentially voxels having a voxel distance to voxels of the first set of voxels of one or two voxels. The second predetermined voxel distance is preferentially two, i.e. the voxels of the second neighboring set of voxels have preferentially a voxel distance to voxels of the first neighboring set of voxels of one or two voxels.

Since, if the above described condition is fulfilled, the values of the volume of interest are modified such that the predetermined second fraction of voxel values of the first neighboring set of voxels is smaller than the assigned value of the voxels of the first set of voxels, during the initial segmentation the former first set of voxels and the voxels next to this former first set of voxels can be initially segmented. This allows to initially segment an object completely, even if the object comprises a border having voxel values which differ significantly from inner voxel values of the object.

It is preferred that the steps b) and c) are performed several times with different erosion thresholds. This allows to determine different segmentation results wherein a user can select the segmentation result which is suited best. For example, a radiologist can select the segmentation result which is the best one for the actual diagnosis or treatment purpose. The different erosion thresholds can be predetermined or can be interactively given by a user. It is preferred that the erosion thresholds are located within a range from 0 to a local maximum in the first distance map.

It is further preferred that the erosion operation is performed using the erosion thresholds and the dilation operation is performed according to claims 9 and/or 10. This further improves the quality of the segmentation.

The above mentioned objects are achieved further by an apparatus of segmenting an object in a data set for carrying out the method of segmenting an object in a data set according to the invention, said apparatus comprising:

initial segmenting means for initial segmenting of the object, in particular by using a region growing method, resulting in a first set of voxels, erosion means for performing an erosion operation on the first set of voxels resulting in an eroded set of voxels and dilation means for performing a dilation operation on the eroded set of voxels resulting in a dilated set of voxels, wherein the erosion operation depends on a variable erosion threshold and wherein the dilation operation depends on a variable dilation threshold.

The above mentioned objects are further achieved by a computer program of segmenting an object in a data set for carrying out the steps according to the method of segmenting an object in a data set, when the computer program is run on a computer, comprising:

first program code means for initial segmenting of the object, in particular by using a region growing method, resulting in a first set of voxels, second program code means performing an erosion operation on the first set of voxels resulting in an eroded set of voxels and third program code means for performing an dilation operation on the eroded set of voxels resulting in a dilated set of voxels, wherein the erosion operation depends on a variable erosion threshold and wherein the dilation operation depends on a variable dilation threshold.

The above mentioned objects are further achieved by a method of segmenting an object in a data set, said method comprising the following steps:
a) initial segmenting of the object, in particular by using a region growing method, resulting in a first set of voxels,
b) modifying the first set of voxels by:
  determining a complement of the first set of voxels,
  performing a connected component analysis on the complement of the first set of voxels resulting in the largest connected non-segmented area,
  subtracting the largest connected non-segmented area from the data set resulting in a modified first set of voxels.
c) performing a first distance transformation to determine for each of at least some voxels of the data set the first minimal distance resulting in a first distance map, wherein the first minimal distance of each of at least some voxels of the data set is the distance of the respective voxel of the at least some voxels of the data set to a voxel outside of the first set having the shortest distance to the respective voxel of the at least some voxels of the data set,
d) determining a seed point in the first set of voxels being the position of a maximum, in particular of a local maximum, in the first distance map,
e) determining an erosion threshold by performing a variable threshold region growing on the first distance map starting from the determined seed point wherein the erosion threshold is equal to or larger than the highest threshold sufficient to reach the boundaries of the data set.
f) performing an erosion operation on the first set of voxels resulting in an eroded set of voxels, wherein the erosion operation is performed such that the eroded set of voxels comprises all voxels of the first set of voxels whose first minimal distance is smaller than or equal to the erosion threshold,
g) performing a second distance transformation to determine for each of at least some voxels of the data set the second minimal distance, wherein the second minimal distance of each of the at least some voxels of the data set is the distance of each of the at least some voxels of the data set to a voxel of the eroded set of voxels having the shortest distance to the respective voxel of the at least some voxels of the data set,
h) performing a dilation operation on the eroded set of voxels resulting in a dilated set of voxels such that the dilated set of voxels includes all voxels whose second minimal distance to voxels of the eroded set of voxels is smaller than the dilation threshold, wherein the dilation threshold is defined such that the dilated set of voxels comprises the same or more voxels than the first set of voxels and/or that the dilation threshold is equal to or larger than the erosion threshold.

These steps remove small and large structures which are attached to the object which has to be segmented. Furthermore, these steps segment objects of different size with a quality which is improved in comparison to known segmentation methods.

It is preferred that, after the dilation operation, following steps are performed:
  determining the intersection of the boundary of the dilated set of voxels with the first set of voxels resulting in an intersected set of voxels,
  dilating the intersection by a tolerance summand resulting in a dilated intersected set of voxels,
  subtracting the dilated intersected set of voxels from the dilated set of voxels.

These steps also remove small structures connected to the object from the segmentation, in particular, vessels, which are connected to a nodule, which has to be segmented.

It is further preferred that, if the dilation threshold is larger than the erosion threshold, the tolerance summand is equal to the difference between the dilation threshold and the erosion threshold. This value of the tolerance summand improves the removal of small structures of the segmentation of the object.

The above mentioned objects are further achieved by a method of segmenting an object in a data set, said method comprising the following steps:
a) initial segmenting of the object, in particular by using a region growing method, resulting in a first set of voxels,
b) modifying the first set of voxels by:
  determining a complement of the first set of voxels,
  performing a connected component analysis on the complement of the first set of voxels resulting in the largest connected non-segmented area,
  subtracting the largest connected non-segmented area from the data set resulting in a modified first set of voxels,
c) performing a convex hull operation on the largest connected non-segmented area resulting in a convex set of voxels,
d) modifying the first set of voxels by intersecting the first set of voxels with the convex set of voxels wherein the intersection is the modified first set of voxels,
e) performing a first distance transformation to determine for each of at least some voxels of the data set the first minimal distance resulting in a first distance map, wherein the first minimal distance of each of at least some voxels of the data set is the distance of the respective voxel of the at least some voxels of the data set to a voxel outside of the first set having the shortest distance to the respective voxel of the at least some voxels of the data set,
f) determining a seed point in the first set of voxels being the position of the maximum in the first distance map,
g) determining an erosion threshold by performing a variable threshold region growing on the first distance map starting from the determined seed point wherein the erosion threshold is equal to or larger than the highest threshold sufficient to reach the boundaries of the data set,
h) performing an erosion operation on the first set of voxels resulting in an eroded set of voxels, wherein the erosion operation is performed such that the eroded set of voxels comprises all voxels of the first set of voxels whose first minimal distance is smaller than or equal to the erosion threshold,
i) performing a second distance transformation to determine for each of at least some voxels of the data set the second minimal distance, wherein the second minimal distance of each of the at least some voxels of the data set is the distance of each of the at least some voxels of the data set to a voxel of the eroded set of voxels having the shortest distance to the respective voxel of the at least some voxels of the data set,
j) performing an dilation operation on the eroded set of voxels resulting in a dilated set of voxels such that the dilated set of voxels includes all voxels whose second minimal distance to voxels of the eroded set of voxels is smaller than the dilation threshold, wherein the dilation threshold is defined such that the dilated set of voxels comprises the same or more voxels than the first set of voxels and/or that the dilation threshold is equal to or larger than the erosion threshold.

These steps remove small and large structures which are attached to the object which has to be segmented. In addition, from convex parts of the object substantially plane parts, which are not part of the object, but to which the object is connected, are removed from the segmentation. For example, a chest wall, to which a nodule, which has to be segmented, is connected, is removed from the segmentation. Furthermore, these steps segment objects of different size with a quality which is improved in comparison to known segmentation methods.

It is further preferred that, after the dilation operation, following steps are performed:
- determining the intersection of the boundary of the dilated set of voxels with the first set of voxels resulting in an intersected set of voxels,
- dilating the intersection by a tolerance summand resulting in a dilated intersected set of voxels,
- subtracting the dilated intersected set of voxels from the dilated set of voxels.

These steps remove further small structures which are connected to the object which has to be segmented.

It is preferred that, if the dilation threshold is larger than the erosion threshold, the tolerance summand is equal to the difference between the dilation threshold and the erosion threshold. This further improves the removing of small structures which are connected to the object which has to be segmented.

It is a further object of the invention to provide a method and apparatus of determination the volume of a segmented object which determines the volume of the segmented object reproducible and accurate, even if scan and/or reconstruction parameters have been changed and/or if the segmented object is connected to surrounding structures.

This and further objects are achieved by a method of determination of the volume of a segmented object, in particular a lesion, in a data set, said method comprising the following steps:
- defining an inner set of voxels comprising voxels arranged inside the segmented object and having a distance from a boundary of the segmented object which is larger than a predetermined minimum distance, wherein, if such voxels do not exist, the inner set of voxels is a zero set of voxels,
- defining an outer set of voxels comprising voxels arranged outside the segmented object and having a distance from the boundary of the segmented object which is larger than the predetermined minimum distance,
- defining a middle set of voxels comprising voxels which are not included in the inner or outer set of voxels,
- assigning to each voxel of the inner set of voxels the same weighting factor, in particular one, if the inner set of voxels is not a zero set of voxels,
- assigning to each voxel of the middle set of voxels a weighting factor which depends on the position and/or the value of the respective voxel within the middle set of voxels and/or the values of the voxels in the inner and outer set of voxels,
- determining the volume of the segmented object, wherein the weighting factors assigned to the voxels of the middle set of voxels and, if the inner set of voxels is not a zero set of voxels, of the inner set of voxels are added.

Due to the use of the weighting factors, the partial volume effect is considered, which improves the accuracy of the determined volume. Furthermore, this method can easily be integrated in known workstations and calculates the volume of a segmented object with a low computational effort.

It is further preferred that an inner average voxel value is determined for the inner set of voxels, if the inner set of voxels is not a zero set of voxels, that an outer average voxel value is determined for the outer set of voxels and that the weighting factors assigned to the voxels of the middle set of voxels depend on the ratio of the difference between the voxel value of the respective voxel of the middle set of voxels and the outer average voxel value to the difference between the inner average voxel value and the outer average voxel value. It is further preferred that, if the inner set of voxels is a zero set of voxels, an outer average voxel value is determined for the outer set of voxels, wherein the weighting factors assigned to the voxels of the middle set of voxels depend on the ratio of the difference between a voxel value of the respective voxel of the middle set of voxels and the outer average voxel value to the difference between a predetermined inner average voxel value and the outer average voxel value. The predetermined inner average voxel value is preferentially a voxel value, which is known to be a typical voxel value for the object which has to be segmented. This typical voxel value can be determined from other data sets, in which objects of the same kind are represented. Furthermore, the typical voxel value is often known from literature, in particular, if the object is a lesion, like a nodule.

This averaging further improves the accuracy of the determined volume.

It is preferred that, in the method of determination of the volume of a segmented object according to the invention, the segmented object has been segmented according to method of segmenting an object of a data set according to the invention. Since the segmentation according to the invention yields an improved segmentation, the determination of the volume of an object will be further improved.

It is further preferred that the segmented object has been segmented according to claim 11 and that the inner, middle and outer set of voxels do not comprise voxels which are in the dilated intersected set of voxels. The dilated intersected set of voxels are supposed to correspond to small structures which are connected to the object. Therefore, if the inner, middle and outer set of voxels do not comprise voxels of the dilated set of voxels, these small structures are not considered in the determination of the volume of the segmented object. This improves the accuracy of the determination of the volume of the segmented object.

It is further preferred that the segmented object has been segmented according to claim 14 and that the inner, middle and outer sets only comprise voxels located outside the convex set of voxels. The voxels of the convex set of voxels are supposed to correspond to a substantially plane structure to which the object is connected. Therefore, if the inner, middle and outer set of voxels do not comprise voxels of the convex set of voxels, voxels of an attached substantially plane structure, for example, if a nodule has to be segmented, of a chest wall, are not considered in the determination of the volume. This further improves the accuracy of the determination of the volume of the segmented object.

The above mentioned objects are further achieved by an apparatus of determination of the volume of a segmented object, in particular a lesion, in a data set, said apparatus comprising:
- defining means,
  - for defining an inner set of voxels comprising voxels arranged inside the segmented object and having a distance from a boundary of the segmented object which is larger than a predetermined minimum distance, wherein, if such voxels do not exist, the inner set of voxels is a zero set of voxels, for defining an outer set of voxels comprising voxels arranged outside the segmented object and having a distance from the boundary of the segmented object which is larger than the predetermined minimum distance, for defining a middle set of voxels comprising voxels which are not included in the inner or outer set of voxels, assigning means for assigning to each voxel of the inner set of voxels the same weighting factor, in particular one, for assigning to each voxel of the middle set of voxels a weighting factor which depends on the position and/or the value of the respective voxel within the middle set of voxels and/or the values of the voxels in the inner voxel and outer set of voxels, determining means for determining the volume of the segmented object, wherein the determining means is adapted to add the weighting factors assigned to the voxels of the middle set of voxels and, if the inner set of voxel is not a zero set of voxels, of the inner set of voxels.

It is preferred that the inner set of voxels comprises all voxels arranged inside the segmented object and having a distance from the boundary of the segmented object which is larger than the predetermined distance.

The above mentioned objects are further achieved by a computer program of determination of the volume of a segmented object, in particular a lesion, in a data set for carrying out the steps according to the method of determination of the volume of a segmented object according to the invention, when the computer program is run on a computer, comprising:

first program code means for defining an inner set of voxels comprising voxels arranged inside the segmented object and having a distance from the boundary of the segmented object which is larger than a predetermined minimum distance, second program code means for defining an outer set of voxels comprising voxels arranged outside the segmented object and having a distance from the boundary of the segmented object which is larger than the predetermined minimum distance, third program code means for defining a middle set of voxels comprising voxels which are not included in the inner or outer set of voxels, fourth program code means for assigning to each voxel of the inner set of voxels the same weighting factor, in particular one, if the inner set of voxels is not a zero set of voxels, fifth program code means for assigning to each voxel of the middle set of voxels a weighting factor which depends on the position and/or the value of the respective voxel within the middle set of voxels and/or the values of the voxels in the inner and outer set of voxels, sixth program code means for determining the volume of the segmented object, wherein the weighting factors assigned to the voxels of the middle set (PV) of voxels and, if the inner set of voxels is not a zero set of voxels, of the inner set of voxels are added.

It is a further object of the invention to provide a method and apparatus of segmentation an object in an image data set and of determination of the volume of a segmented object which is more robust on objects of different size, different density, different morphology and different connections to surrounding structures and on different scan and reconstruction parameters than known methods, and which is faster than known methods.

It is a further object of the invention to provide a method and a apparatus of segmentation an object in an image data set and of determination of the volume of a segmented object which can be easily integrated into existing workstations or CAD systems.

This and further objects are achieved by a method of segmenting an object in a data set and of determination of the volume of a segmented object, wherein the object is segmented according to claim 1 yielding a segmented object and wherein the volume of the segmented object is determined according to claim 30.

The combination of the method of segmenting an object in a data set according to the invention and of the method of determination of the volume of the segmented object according to the invention is more robust on objects of different size, different density, different morphology and different connections to surrounding structures and on different scan and reconstruction parameters than known methods. Furthermore, this method is faster than known methods and can easily be integrated into existing workstations or CAD systems. In addition, this method determines the volume of the segmented object reproducible and accurate, even if scan and/or reconstruction parameters have been changed and/or if the segmented object is connected to surrounding structures.

The above mentioned objects are achieved further by an apparatus of segmenting an object in a data set and of determination of the volume of a segmented object, wherein the apparatus comprises an apparatus of segmenting an object according to claim 22 and an apparatus of determination of the volume of a segmented object according to claim 36.

The above mentioned objects are further achieved by a computer program of segmenting an object in a data set and of determination of the volume of a segmented object for carrying out the steps according to the method of claim 38, when the computer program is run on a computer, comprising the computer program code means of the computer program of segmenting an object in a data set according to claim 23 and the computer program code means of the computer program of determination of the volume of a segmented object of claim 37.

BRIEF DESCRIPTION OF THE DRAWINGS

The invention will be described in the following in detail with respect to a drawing in which.

PREFERRED EMBODIMENTS OF THE INVENTION

Figure 1:
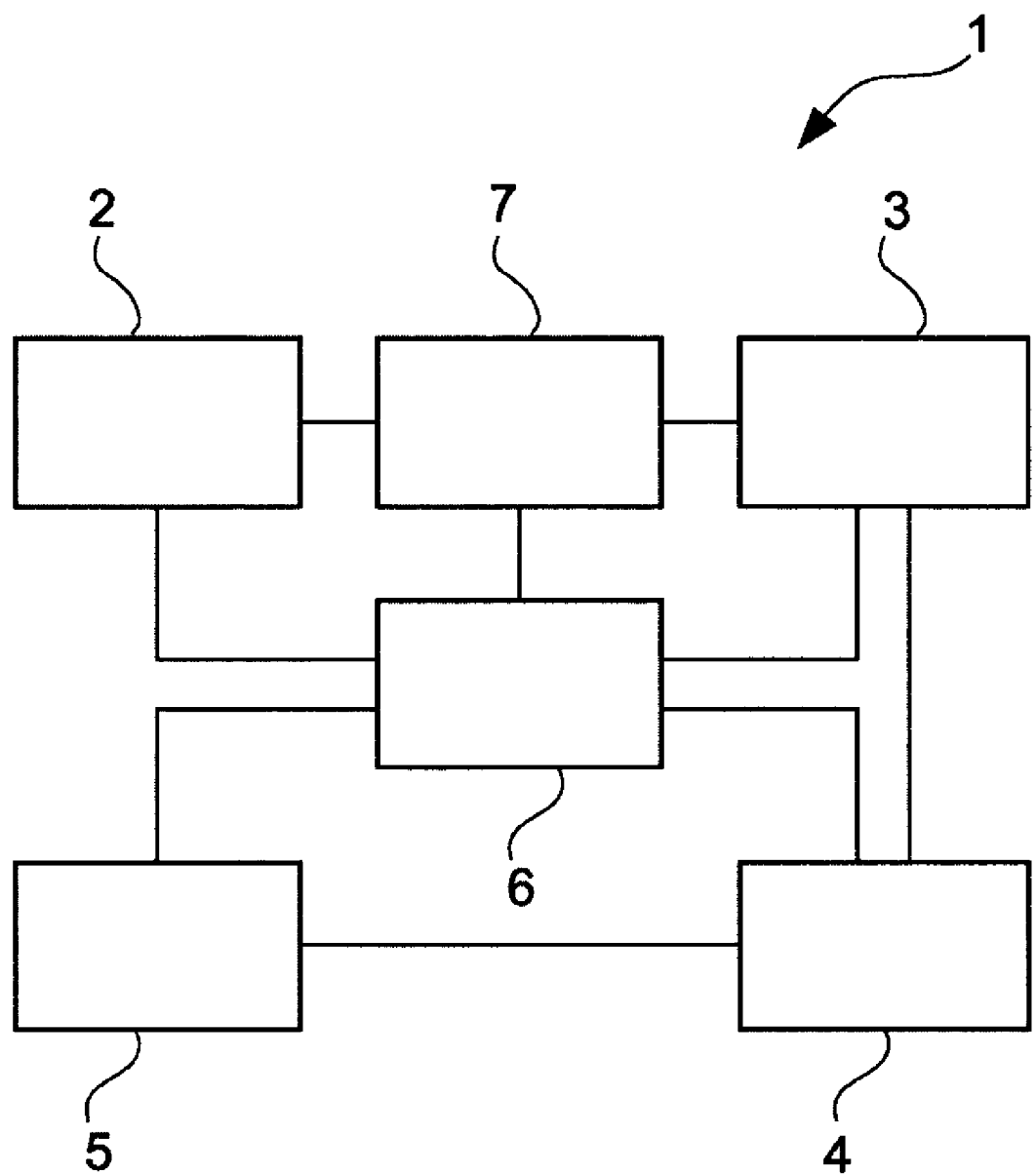
FIG. 1 shows a schematical view of an apparatus of segmenting an object in a data set according to the invention.

FIG. 1 is a schematical view showing an apparatus 1 of segmenting an object in a data set according to the invention. The apparatus 1 comprises an initial segmenting means 2 which is adapted to generate an initial segmentation of the object in the data set resulting in a first set of voxels. The apparatus 1 comprises further preferentially a convex hull means 7 which is adapted to determine the largest connected non-segmented area P in a volume of interest (VOI) by connected component analysis, which is adapted to determine the convex hull of the area P and which is adapted to intersect the initial segmentation with the convex hull of the area P, for example, in order to mask out a chest wall to which a nodule, which, for example, has to be segmented, is connected. The result is inputted to an erosion means 3 which is adapted to perform an erosion on the inputted voxels resulting in an eroded set of voxels. The apparatus 1 further comprises a dilation means 4, which is adapted to dilate the eroded set of voxels resulting in a dilated set of voxels, and preferentially an intersection means 5, which is adapted to determine an intersected set of voxels by intersecting the first set of voxels with the boundary of the dilated set of voxels, to dilate the intersected set of voxels resulting in a dilated intersected set of voxels and to intersect the dilated set of voxels with the set of voxels outputted by the convex hull means 7 resulting in a intermediate set of voxels and to subtract from this intermediate set of voxels the dilated intersected set of voxels resulting in a final segmentation of the object.

The initial segmenting means 2, the convex hull means 7, the erosion means 3, the dilation means 4 and the intersection means 5 are controlled by a control means 6 preferentially according to the steps 101 to 118 or 101' to 118, which will be described further below.

The initial segmenting means 2, the convex hull means 7, the erosion means 3, the dilation means 4, the intersection means 5 and the control means 6 are, in particular, computers. Preferentially, these means are integrated into one computer.

In the following the method of segmenting an object in a data set will be described in more detail.

The method of segmenting an object in a data set will be performed on an input volume being the VOI. The input volume is preferentially a cubic input volume. The VOI can be set by a user, for example, a radiologist. Alternatively, the VOI can be automatically set, or it can be the whole image data set, which has been reconstructed in advance, for example, by a CT or MR scanner. In the following, the set V denotes the set of all voxels within the input volume.

The VOI can be selected by using a line, which is given by a user, on a slice of the data set, which is preferentially an image data set. If the VOI is selected by using this line, the center of the VOI is set to the center of the line and the edge length of the VOI is determined as the length of the line multiplied with preferentially 1.6.

In this embodiment the VOI is constituted of voxels comprising density values ranging from −1024 Hounsfield Units (HU) to 3071 HU. In other embodiments the voxels can comprise other kind of values.

In case of voxel anisotropy, the volume can be resampled prior to the following segmentation steps to isotropic voxels to allow for consistent image processing on the three-dimensional voxel matrix.

The VOI, on which the method of segmenting an object in a data set will be performed, contains the object, which has to be segmented, completely, i.e., the object is located completely within the VOI. Furthermore, the object does not touch the VOI boundaries. These two conditions are referred to as precondition P2.

In this embodiment the object, which has to be segmented, is a nodule in the lung of a human being. But the invention is not limited to this case. The method according to the invention is able to segment any object located within a VOI.

In addition, the VOI, on which the method of segmenting an object in a data set will be performed, comprises a seed point S located on the object. This condition is referred to as P1.

The seed point S can be set by a user, for example, a radiologist, or it can be set automatically, for example, in the center of the VOI. If the seed point S is not located on the object, a simple seed correction mechanism can be used to ensure that the seed point S is located on the object.

The seed correction mechanism searches for the voxel, which is from a group of voxels fulfilling a threshold criterion the closest one with respect to the initial seed point. The threshold criterion can comprise upper and lower thresholds, wherein it is known, that voxel values of the object are located within the range defined by these lower and upper thresholds. Furthermore, a range with a predetermined width centered around the value of the center voxel of the VOI can be defined, wherein the seed correction mechanism searches for a voxel, which is from the voxels, whose voxel values are located within this range, the closest one with respect to the initial seed point.

Figure 2:
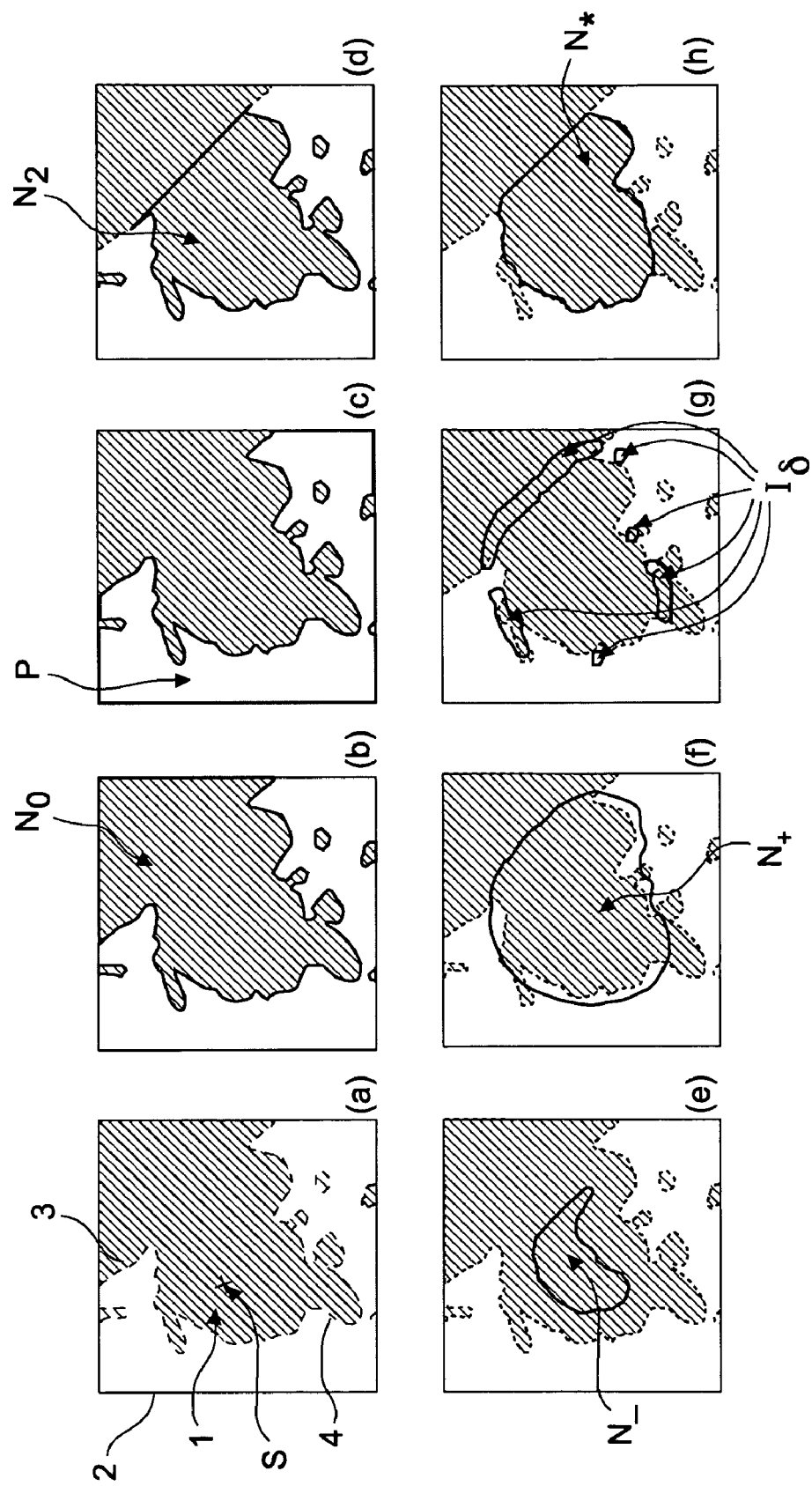
FIG. 2 shows schematically an object in a data set, after different steps of the method of segmenting an object in a data set have been performed.

An example of a nodule in a VOI is shown in FIG. 2a. The nodule 1 is a pulmonary lesion located completely within the VOI 2. The nodule 1 is in contact with a chest wall 3 and vasculature 4. A seed point S is located on the nodule 1.

In the following the method of segmenting an object in a data set, which will be performed on the VOI, is described with respect to the flowchart shown in FIG. 3. The method uses some standard image processing steps, for example, thresholding, region growing, connected component analysis, convex hull, and Euclidean distance transform. These standard image processing steps are well known and described and discussed, for example, in "Image Processing, Analysis and Machine Vision (2nd Edition)", M. Sonka, V. Hlavac, and R. Boyle, PWS, 1998, and will therefore not be described in detail.

In step 101 an initial segmentation is performed using a region growing algorithm with a fixed predetermined lower threshold starting from the seed point S. It is preferred, that the predetermined lower threshold has a value in the range of −480 HU to −340 HU. It is further preferred that the predetermined lower threshold has a value of −400 HU, since it is the arithmetic mean of 50 HU, which is a typical nodule density, and −850 HU, which is common for parenchyma.

The result of step 101 is an initial set of voxels $N_0$, i.e., a first set of voxels, the first estimate of the nodule region. The initial set of voxels $N_0$ is indicated by the thick continuous line in FIG. 2b which surrounds the initial set of voxels $N_0$.

Subsequently, in step 102, a connected component analysis is performed on the complement of $N_0$. The largest connected, non-segmented area P is extracted. It corresponds to the largest connected area of lung parenchyma in the VOI surrounding the target nodule. The area P is indicated by the thick continuous line in FIG. 2c which surrounds the area P.

In step 103 a superset $N_1 = V - P$ of $N_0$, which is essentially $N_0$ with holes closed, is defined.

The superset $N_1$ is a modified first set of voxels.

As the example in FIG. 2b shows, not only adjacent vasculature but also parts of the chest wall can be included in the initial segmentation result $N_0$ or in the superset $N_1$. Therefore, in step 104 it will be decided whether the nodule is connected to a chest wall or not.

In order to decide, whether the nodule is connected to a chest wall or not, the ratio of boundary voxels of V, that are covered by $N_0$, to boundary voxels of V, that are not covered by $N_0$, is measured. If this ratio is larger than a predetermined decision value, it is decided that the nodule is connected to a chest wall. If this ratio is not larger than the predetermined decision value, it is decided that the nodule is not connected to a chest wall.

In this embodiment, the boundary voxels of V are the outermost voxels of V building a surrounding rim having a thickness of one voxel.

The predetermined decision value can be determined empirically or by calibration in advance. A boundary coverage ratio of 10% was empirically determined to be a suitable threshold to decide whether a lung nodule is connected with a chest wall or not.

If the nodule is not connected to a chest wall, P is basically the complement of $N_0$, except for dark areas (such as necrosis or noise) within the nodule. In this case the method continuous with step 106.

If the nodule is connected to a chest wall, the chest wall is separated from the set $N_1$ by the following step 105.

Since the results would not be affected in case of no chest wall connection, step 104 can be omitted. This step is only used in order to avoid unnecessary time consumption.

The method of segmenting an object in a data set according to the invention is also applicable to CT images. CT images do not generally show a visible density contrast between the nodule and the attached chest wall (cf. FIG. 2a). Hence, the aim of the chest wall separation procedure in step 105 is to reproducibly separate the nodule from the chest wall using morphological processing only. In order to achieve this, the algorithm makes use of the anatomical fact that the lungs are mostly convex, while the surrounding parenchyma, defined by P, shows at least one major concavity: the nodule itself. To remove concavities from an object, a convex hull operation can be used. It provides the minimal extension of a set M to a convex set that contains all points of M. The convex hull of P is used to mask out the chest wall part from $N_1$ and provides an improved estimate of the nodule region. That is, an intersection set $N_2$ is determined being the intersection of the set $N_1$ with the convex hull of P. In FIG. 2d, the intersection set $N_2$ is surrounded by a thick continuous line.

The intersection set $N_2$ is a further modified first set of voxels.

Since the pleura separation is only capable of masking out structures that are not part of the lungs, adjacent vessels are still included in $N_2$. As already mentioned above, the method of segmenting an object in a data set according to the invention is also applicable to CT images. The density information in CT images does not suffice to allow a density-based separation procedure, but nodules and vessels differ significantly in morphology. The nodule's connection to external vasculature is usually thinner than the nodule itself. Hence, a separation of the structures can be performed by morphological opening (erosion followed by dilation). To implement both erosion, and the subsequent dilation, two converse distance transformations are applied.

In step 106 a primary three-dimensional Euclidean distance transform $E:V \rightarrow \mathbb{R}$ is performed to compute the minimum distance from each voxel in $N_2$ to the background. World coordinates are used in order to account for voxel anisotropy:

$$E(v) := \min\{\|\text{world}(v) - \text{world}(v')\|_2 : v' \notin N_2\}. \quad (1)$$

In the next steps 107 to 110 an erosion threshold $\theta_-$ is determined such that unwanted adjacent structures are cut off without clipping significant nodule boundary features. The determination of this threshold in the step 107 to 110 will be discussed in detail in the following.

In step 107 the position of the seed point S within the VOI is optimized.

To optimize the initial seed point S, the center of the target lesion, i.e. the nodule 1, needs to be approximated. The first distance map E encodes the distance to the closest boundary voxel for each voxel in $N_2$. Starting from the initial seed point S, which is initially located on the nodule, a local maximum search on E approximates the center of the lesion. The position of this local maximum is the position of a new seed point S'.

This not only provides the new seed point S', but with its boundary distance E(S) also a good approximation for the erosion threshold from below $$\tilde{r} := E(S') \quad (2)$$

for the actual nodule radius: By construction, the new seed point S' is located on a local boundary distance maximum, and since nodules are mostly convex, the local maximum is likely to be close or even identical to the global maximum. Applying an erosion threshold greater than $\tilde{r}$ would result in a complete eradication of all nodule voxels during the erosion. Hence, an erosion threshold of $\tilde{r}$ corresponds to an erosion strength of 100% (or 1, respectively), enabling to define this term more formally as the percentage of eroded boundary distance with respect to $\tilde{r}$.

A normalized distance $\phi$ for $e \in \mathbb{R}$ is defined as $$\varphi(e) := \frac{e}{\tilde{r}}. \quad (3)$$

In step 108 a normalized distance map $E_\phi$ is determined according to following equation:

$$E_\phi(v) := \phi(E(v)). \quad (4)$$

In order to minimize the volumetric error, it is preferred for the segmentation process that each attached structure that is to be separated from the lesion is cut off as close to the target lesion as possible.

In order to explain the following steps, some theoretical considerations will be discussed next.

If erosion strength values exist that (C1) are large enough to cut off all adjacent structures close to their connection point, but still (C2) comply with the established upper bound $E_\phi(S')$, the smallest of them will subsequently be referred to as optimal erosion strength $\theta_*$, since, by fulfilling the conditions (C1) and (C2) while preserving as much of the lesion's original shape as possible, it is optimal with respect to the model proposed in the following.

In the following, it will be discussed whether, and under which circumstances, such an optimal strength exists, as well as if and how it can be computed efficiently.

The outcome of this discussion depends on the morphological characteristics of the adjacent structures and the target lesion itself. To provide a framework for this discussion, a vascular connectivity model is defined, which makes the following two assumptions with respect to vascular attachment:
(A1) Each lung vessel is ultimately originating in the hilum region.
(A2) Each vessel's radius is monotonic decreasing with increasing distance to the hilum.

Since these assumptions describe medical textbook knowledge, they can be considered a reasonable basis for a discussion of nodule-vessel separability. In the following, it will be shown that, given this model and one further constraint, an optimal strength always exists, and that it can be computed efficiently.

Since the algorithm is expected to distinguish irregular nodule boundary features from an adjacent vessel, we need to make use of precondition (P2): That the nodule itself is located completely within the VOI and does not touch its boundaries. With model assumption (A1), each vessel connected to the nodule must cross the VOI boundaries at least once. Due to assumption (A2), the vessel's radius cannot increase during its run through the VOI after having entered the VOI from the hilum side. Finally, it either diminishes to a degree where it is no longer traceable, or it leaves the VOI again. In both cases, eroding with a certain strength has the effect that, if the vessel is eradicated by the erosion at some point, no vessel parts beyond that point can remain.

If one or more vessels are connected to a nodule, two main cases can occur: A vessel can end within the nodule, or continue afterwards. In both cases, the radius of the vessel at the entry point is to be determined, since any erosion strength greater than this radius would not only disconnect the nodule from the vessel at its entry point, but, due to (A2), completely erase the part of the vessel leaving the nodule. This implies one constraint: If the VOI complies with the model, but the nodule radius is smaller than the vessel radius at the entry point, condition (C2) is not fulfilled, and no optimal erosion strength exists. In other words: Given the vasculature model assumptions (A1) and (A2), the separation of a nodule from attached vasculature is possible if and only if none of the attached vessels has a radius larger than $\tilde{r}$ at its entry point into the nodule. Since those cases are extremely rare, it is reasonable to say that separation from vasculature can be achieved by global morphological erosion in almost every case.

In the following, it will be described how the optimal strength can be computed in an efficient way. By means of $E_\phi$, the situation can be expressed in terms of paths from the optimized seed point S' to the VOI boundaries: Let $P_{N_2}^\gamma$ denote the set of all paths $(v_0, v_1, \ldots, v_n)$ in $N_2$ of arbitrary length n, which are starting from $v_0$=S' and terminating on a voxel $v_n$ on the VOI boundaries based on a three-dimensional neighborhood relation $\gamma$. Then the optimal erosion strength $\theta_*$ can be defined as $$\theta_* := \max\{\min\{E_\phi(v) : v \in p\} : p \in P_{N_2}^\gamma\}. \quad (5)$$

In other words, $\theta_*$ is the maximum radius of all minimal radii along a path in $P_{N_2}^\gamma$.

In step 109 the optimal erosion strength $\theta_*$ is determined according to equation (5). It is preferred to perform a variable threshold region growing on $E_\phi$ to compute $\theta_*$ in an efficient way. Starting from S' with no upper threshold, but a lower threshold of 1 which is successively lowered until the VOI boundaries are reached. The optimal erosion strength is then preferentially determined as the last lower threshold before termination.

As realistic as the model assumptions may appear, clinically acquired data require that discretization effects, motion artifacts, noise, and anatomical anomalies are taken into account. They can result in a violation of both assumptions (A1) (in case of very small vessels) and (A2) (with respect to the diameter monotony). Hence, using the theoretically optimal strength $\theta_*$ directly for the erosion is not always the best choice in practice. To address the problem of very small vessels that are touching the lesion but cannot be traced all the way to the VOI boundaries, the resulting value is not only clipped against the upper bound 1 (ensuring that the erosion does not erase the lesion completely), but also against an artificial lower bound $\epsilon$. As a countermeasure to possible monotony violations, the erosion strength that is actually used needs to be slightly higher than the computed optimal one, and an offset $\mu$ is added, if a connection was detected. This pragmatic approach leads to the following definition:

$$\theta_- := \begin{cases} 1: & \theta_* > 1, \\ \epsilon: & \theta_* < \epsilon \\ \theta_* + \mu: & \text{otherwise.} \end{cases} \quad (6)$$

The parameters $\epsilon$ and $\mu$ are predetermined. They can be determined empirically or by calibration. They are defined independently from the actual lesion size as percentages, since they are associated with the erosion strength, i.e., the normalized erosion threshold. The value $\mu$ ranges preferentially from 10% to 30%, further preferred from 10% to 20%, and it is also preferred that $\mu$ has a value of 10%, 20% or 30%. The value for $\epsilon$ is preferentially located within a range of 10% to 40%, further preferred within a range of 20% to 30%, and it is further preferred that $\epsilon$ has a value of 25%.

In step 110 the erosion threshold $\theta_-$ is determined according to equation (6).

Having determined a suitable strength, in step 111 the erosion is to be performed on the non-normalized, first distance map E by removing all voxels with distances below the absolute erosion threshold $$\Theta_- := \phi^{-1}(\theta_-). \quad (7)$$

The resulting eroded nodule mask $N_-$, i.e., the resulting eroded set of voxels, is defined as $$N_- := \{v \in N_2 | E(v) \geq \Theta_-\}. \quad (8)$$

In FIG. 2e the eroded nodule mask $N_-$ is indicated by a thick continuous line surrounding the eroded nodule mask $N_-$.

It should be noted that this morphological opening operation would generally not succeed in separating a nodule from the chest wall, since pleural connections are typically much broader and any erosion with the necessary strength would either eradicate any irregular nodule morphology or erase the whole nodule.

Since it was the objective of the erosion to cut off each vessel at its connection point, more distal parts of the vessel could remain which might reconnect to the nodule after the dilation. However, by construction of the threshold, these vessel parts are now disconnected from the nodule component with respect to the neighborhood relation $\gamma$. Given that the target nodule component is uniquely identified by the modified seed point S', it can be selected easily by $\gamma$-connectivity analysis. The $\gamma$-connectivity analysis can, for example, be performed by a region growing process using the neighborhood relation $\mu$.

If some distal parts of the vessel remain, or, if other objects have to be segmented, other parts remain, the eroded set of voxels is divided into several separated sets of voxels. In this case, it is preferred to select the set of voxels on which the seed point is located which has been determined in step 107. The following are then performed with this selected set of voxels of the several sets of voxels.

In the following steps, die dilation of the eroded set of voxels $N_-$ will be described.

In step 112 a second distance map D, which maps each voxel to its distance to the eroded set of voxels $N_-$, is calculated according to following equation:

$$D(v):=\min\{\|world(v)-world(v')\|_2 : v' \in N_-\}. \quad (9)$$

In order to obtain a approximation to the nodule, the erosion threshold $\Theta_-$ itself can be used for the upper threshold to implement the dilation on D. But, in order to include smaller irregularities of the nodule boundaries that were previously eradicated by the erosion procedure, it is preferred to determine in step 113 a dilation threshold $\Theta_+$ which is slightly larger than $\Theta_-$, i.e., $\Theta_+ := \Theta_- + \delta$. The constant $\delta$ is a predetermined constant, which has been determined empirically or by calibration. The constant 6 has preferentially a value of 2 mm.

In step 114 the eroded set of voxels $N_-$ is dilated by using the secondary distance map D and the dilation threshold $\Theta_+$ according to following equation:

$$N_+ := \{v \in V : D(v) < \Theta_+\}. \quad (10)$$

In FIG. 2f the dilated set of voxels $N_+$ is indicated by a thick continuous line surrounding the dilated set of voxels $N_+$.

This procedure not only adds some of the surrounding lung parenchyma and chest wall, which can be removed easily by intersection with $N_2$, but also part of the previously removed vessels are unintentionally included. Therefore, in step 115 the intersection I of the first set of voxels with the boundaries of the dilated set of voxels $N_+$ is computed, $I := N_0 \cap \partial N_+$. In this embodiment the boundary of the dilated set of voxels $\partial N_+$ comprises the voxels along the thick continuous line in FIG. 2f.

In step 116 the intersection I, i.e., the intersected set of voxels, is dilated by the constant $\delta$, i.e., by the tolerance summand $\delta$, resulting in a dilated intersected set of voxels $I_\delta$.

The dilated intersected set of voxels $I_\delta$ is indicated by the thick continuous lines in FIG. 2g surrounding the dilated intersected set of voxels $I_\delta$. The dilated set of voxels $I_\delta$ will used in the next step to remove unwanted structures.

In step 117, the final segmentation result $N_*$ is determined according to following equation:

$$N_* := (N_+ \cap N_2)/I_\delta. \quad (11)$$

In FIG. 2h the final segmentation result $N_*$ is indicated by a thick continuous line surrounding the final segmentation result.

The method of segmenting an object in a data set terminates in step 118.

In a preferred embodiment, after the final segmentation result $N_*$ has been determined in step 117, the erosion threshold $\theta_-$ can be varied and the steps 111 to 117 are repeated. The value of $\theta_-$ can be iteratively increased or decreased in certain steps, possible values ranging between 0 and 100%. Since preprocessing, chest wall separation as well as the computation of an optimal erosion threshold can be left out after an interactive erosion strength modification, merely an update of all processing steps following the erosion (steps 111 to 117) is required. Thus, the computation time for an update is substantially reduced compared to the initial segmentation.

The erosion threshold $\theta_-$ can be increased or decreased in predetermined steps, in particular, iteratively or sequentially. Or a user can input a erosion threshold $\theta_-$, which is used to determine the final segmentation result $N_*$.

In another embodiment, in particular, if the object is not a lung lesion, but, for example, liver metastases, lymph nodes or brain metastases, the initial segmentation step 101 is modified. This modified step 101' will be described in the following.

The initial segmentation step according to the modified step 101' will be performed by region growing starting from the seed point S, wherein lower and upper thresholds are used.

An important difference between lung nodules and other objects, like other types of lesions, is that the density of lung nodules and the surrounding healthy lung parenchyma in, for example, CT images is well known and can be used for the definition of fixed threshold for an initial region growing. In contrast to this, the density or typical grey values of other objects, such as other lesions, and their surrounding tissue can vary considerably depending on, for example, primary cancer, contrast agent, contrast timing, scan parameters and patient conditions (comorbidity—e.g. ascitis, cirrhosis etc.). Therefore, the lower and upper thresholds for an initial region growing are determined by analysis of the grey value distribution in the VOI of the lesion.

The typical grey value in a small region around the center of the VOI (considered as the typical lesion value L) is compared with the maximum peak of the VOI histogram (considered as the typical value T of the surrounding tissue), wherein the typical grey value L is preferentially the average of some voxels in the center of the VOI, for example, of the voxels located within a center area of the VOI, wherein the center area has preferentially a size of 1%, 2%, 5% or 10% of the size of the VOI. Furthermore, the typical value T of the surrounding tissue is the value of the voxels in the VOI which has the largest frequency of occurrence.

The lower and upper thresholds are determined depending on the relation between the typical lesion value L, i.e., an object value, and the typical tissue value P, i.e., a non-object value. In order to determine the relation between the typical lesion value L and the typical tissue value P, a predetermined interval is centered around the typical tissue value P. The predetermined interval has preferentially a width of 50, i.e. the predetermined interval is [P−25, P+25].

If the typical lesion value L is smaller than the values of the interval around P, the lesion is regarded as a dark lesion. The upper threshold is then set to the average of T and L, the lower threshold to the smallest voxel value within the VOI.

If the typical lesion value L is larger than the values of the interval around P, the lesion is regarded as a bright lesion. The upper threshold is then set to the largest voxel value of the image, the lower threshold to the average of T and L.

If the typical lesion value L lies within the interval around P, the lesion might be darker or brighter than the surrounding tissues, but is the largest object in the VOI. Or the lesion has a quite similar density compared to the surrounding tissue. In both cases the lower threshold and upper threshold are set in narrow margin around L. The lower threshold is preferentially L−50, and the upper threshold is preferentially L+50. After this the quality of these thresholds is tested by a simple analysis on the slice in the middle of the VOI. If too many voxels (more than 70%) of the VOI lie within the thresholds, the thresholds have to be adjusted because they seem to include too much of the surrounding tissue. Thus, the lower and upper thresholds are varied, until less than 70% of the voxels lie within the lower and upper thresholds. The variation can be performed automatically by increasing and/or decreasing the lower and upper thresholds in predetermined steps in predetermined directions. For example, the predetermined step can be 1% of the maximum voxel value within the VOI, and the lower threshold can be increased and the upper threshold can be decreased.

In the modified step 101' a region growing is performed starting from the seed point S and using the above determined lower and upper thresholds. The result of this region growing is the initial set of voxels which will be used in the following steps 102 to 118 to segment the object in the data set.

While the majority of metastases appear to be homogeneous except some that show some necrotic darker parts, there are some kinds of metastases—mostly brain metastases and some liver metastases—which are mostly darker than the surrounding tissue but have a small rim at their border which is brighter than the surrounding tissue. This hyperdense rim should be included in the segmentation mask, but obviously this can not be achieved by a simple region growing with two thresholds. Therefore, in a further embodiment of the method of segmenting an object in a data set according to the invention, before the step 101 or 101', a preprocessing step is introduced.

In the preprocessing step the inner parts of the object are segmented with a known segmentation method, in particular with the segmentation method according to the steps 101' to 118 resulting in an initial set Q of voxels. Than, a first neighboring set R of voxels is defined, wherein the voxels of the first neighboring R set of voxels are located within a first predetermined voxel distance from the initial set Q of voxels. The first predetermined voxel distance is preferentially two voxels, i.e. voxels, which have a voxel distance of one or two voxels to a voxel of the initial set Q of voxels, constitute the first neighboring set R of voxels. Furthermore, a second neighboring set S of voxel is defined, wherein the voxels of the second neighboring set of voxels are located within a second predetermined voxel distance from the first neighboring set R of voxels. The second predetermined voxel distance is preferentially two voxels, i.e. the second neighboring set S of voxels comprises preferentially voxels having a voxel distance to a voxel of the first neighboring set R of voxels of one or two voxels. Than, a first average of the voxels of the first neighboring set R of voxels, a second average of the second neighboring set S of voxels and a third average of the initial set Q of voxels are determined. The averages are preferentially median averages. After that, it is determined, whether the following three conditions are fulfilled. According to a first condition, the difference between the first average and the second average has to be larger than a predetermined first fraction of the first average. According to a second condition, the first average has to be larger than the third average, and, according to a third condition, the first average has to be larger than the second average. If these three conditions are fulfilled, to each of the voxels of the initial set Q of voxels a value is assigned such that a predetermined second fraction of voxel values of the first neighboring set R of voxels is smaller than the assigned value of the voxels of the initial set Q of voxels, wherein the values within the volume of interest are modified. The first fraction is preferentially 0.1, and the second fraction is preferentially 0.95 (95% quantile). This will result in a substantially homogeneous bright initial segmentation. With this modified volume of interest the steps 101 to 118 or 101' to 118 will be performed.

In the following an apparatus of determination of the volume of a segmented object, in particular a nodule, in a data set, will be described.

Figure 5:
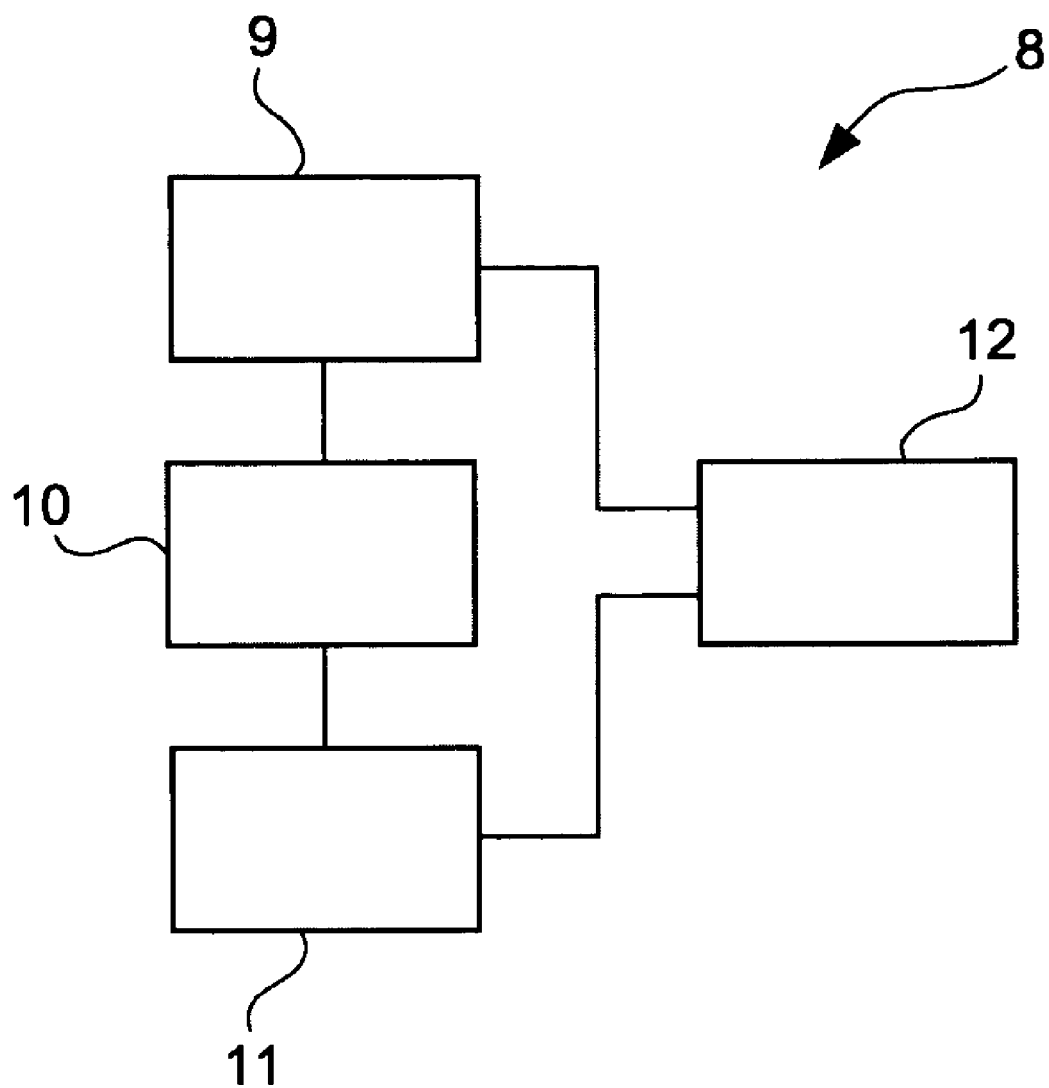
FIG. 5 shows a schematical view of an apparatus of determination of the volume of a segmented object in a data set.

FIG. 5 shows an apparatus 8 of determination of the volume of a segmented object comprising defining means 9, assigning means 10, determining means 11 and control means 12.

The defining means 9 is adapted to define an inner set NC of voxels comprising all voxels arranged inside the segmented object and having a distance from the boundary of the segmented object which is larger than a predetermined minimum distance, to define an outer set PC of voxels comprising voxels arranged outside the segmented object and having a distance from the boundary of the segmented object which is larger than the predetermined minimum distance and to define a middle set PV of voxels comprising voxels located between the inner and outer set of voxels.

The assigning means 10 is adapted to assign to each voxel of the inner set NC of voxels the same weighting factor, in particular one, to assign to each voxel of the middle set PV of voxels a weighting factor which depends on the position of the respective voxel within the middle set of voxels, and/or on the value of the respective voxels within the middle set PV of voxels and the values of the inner set NC of voxels and of the outer set PC of voxels.

The determining means 11 is adapted to determine the volume of the segmented object, wherein the determining means is adapted to add the weighting factors assigned to the voxels of the inner and middle set of voxels. It is preferred that the determining means 11 is further adapted to multiply the resulting sum of weighting factors with the volume of the VOI.

The defining means 9, the assigning means 10 and the determining means 11 are controlled by a control means 12, in particular, according to the steps 201 to 205, which will be described further below.

The defining means 9, the assigning means 10, the determining means 11 and the control means 12 are, in particular, computers. Preferentially, these means are integrated into one computer.

In the following a method of determination of the volume of a segmented object according to the invention will be described.

The method of determination of the volume of a segmented object will be described with respect to a nodule, which has been segmented according to the above described segmentation method, in a CT data set. But the invention is not limited to this case. The volume of any segmented object can be determined according to the invention. Furthermore, instead of a CT data set, the object can be segmented in another data set, for example, a MR or ultrasonic image data set.

In this embodiment, the ratio of nodule tissue within each voxel is assessed in order to determine the amount of volume averaging between nodule tissue and parenchyma for each specific voxel, and its contribution is weighted accordingly. Morphological information from prior segmentation is combined with a knowledge-based density histogram analysis. To avoid influences of vasculature and chest wall regions within the volume of interest on the partial volume analysis, the segmentation results are used: Firstly, since volume averaging occurs only at the nodule boundaries, it is sufficient to constrain the partial volume analysis to their direct vicinity. Secondly, all high-density structures that are connected to the nodule are identified during the segmentation process and can thus be excluded from the analysis explicitly.

Figure 6:
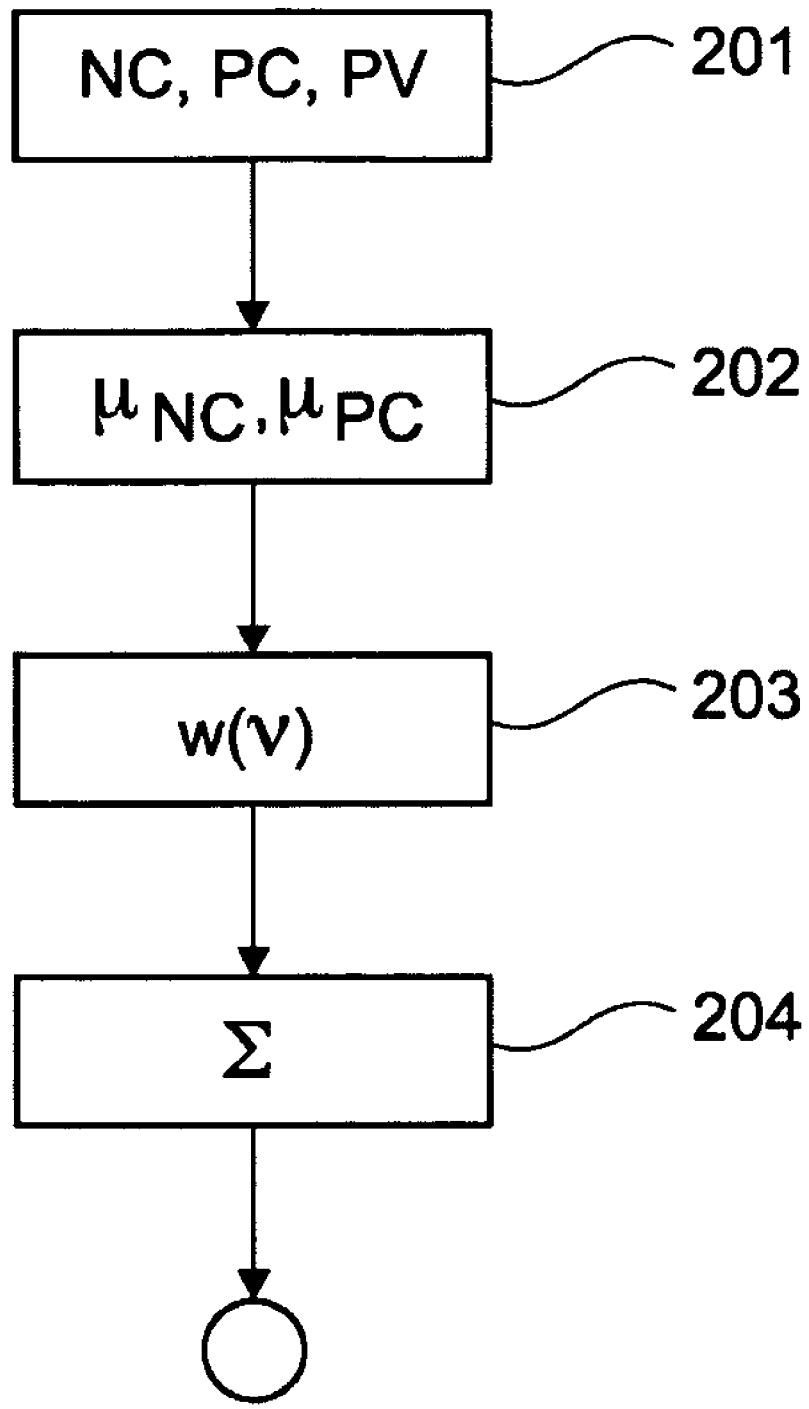
FIG. 6 shows a flowchart of a method of determination of the volume of a segmented object in a data set.

In the following the method of determination of the volume of a segmented object according to the invention will be described in detail with respect to the flowchart shown in FIG. 6.

Figure 7:
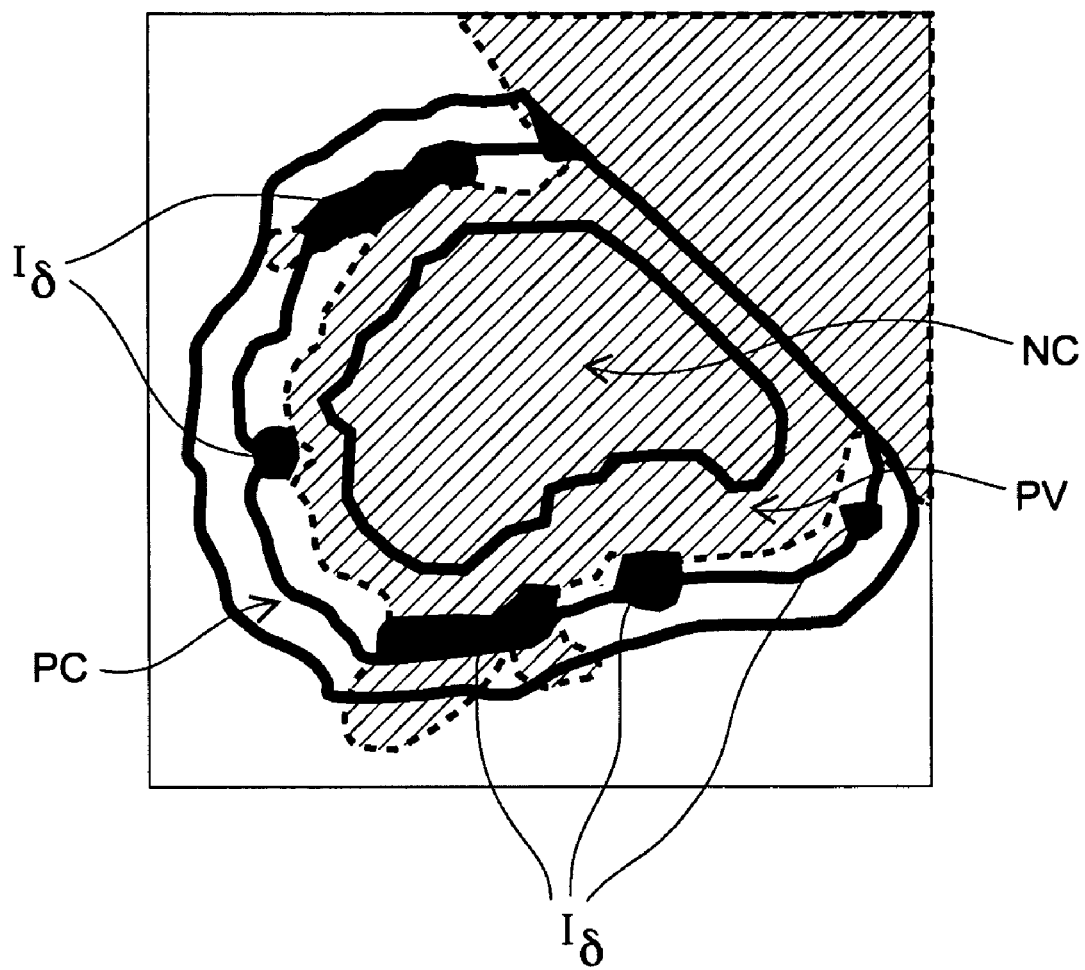
FIG. 7 shows three areas of a data set, in which an object has been segmented, which are used to determine the volume of the segmented object.

Based on the segmented object, which is in this embodiment the final segmentation result $N_*$, in step 201 three different areas, the nodule core NC, a parenchyma area PC and a partial volume region PV are automatically identified by their distance from the boundaries of the final segmentation result $N_*$. The three different areas NC, PC and PV are depicted in FIG. 7. The area NC is located within the nodule, the area PC surrounds the boundary of the segmented object, and the area PV is located between the areas PC and NC.

The three areas are identified by using a parameter $\Delta_{PV}$, describing the maximum distance of any voxel within PV to the segmentation boundaries and thereby defining the region PV. The parameter $\Delta_{PV}$ is determined such that it is large enough to include all voxels representing a non-zero ratio of nodule tissue, but small enough not to include partial volumes from neighboring high density structures. A voxel representing a non-zero ratio of nodule tissue is a voxel whose assumed fraction of the object is larger than zero. The parameter $\Delta_{PV}$ is preferentially predetermined, for example, empirically or by calibration, such that it meets these conditions. The parameter $\Delta_{PV}$ has preferentially a value in the range of 1 mm to 3 mm, further preferred in the range of 1 mm to 2 mm, and it is further preferred that the parameter $\Delta_{PV}$ has a value of 2 mm. A parameter $\Delta_{PV}$ of 2 mm will also be used in the embodiments described further below.

In this embodiment, the nodule is attached to a chest wall, which has been separated from the nodule in the above explained segmentation method. The areas NC, PV and PC are therefore determined such that these areas do not comprise a part of the chest wall (see FIG. 7). Furthermore, in this embodiment, in step 116 a dilated intersected set of voxels $I_\delta$ has been determined. In FIG. 7, the dilated intersected set of voxels $I_\delta$ is indicated by black areas. These dilated set of voxels are excluded from the area PV, because they correspond to vascular attachments.

The area NC is determined such that it comprises the part of segmented object which is not part of the area PV.

The area PC comprises all voxels, which have a distance to the border of the segmented object, which is larger than $\Delta_{PV}$, and which have a distance from the border of the segmented object which is smaller than $\Delta_{PV}$. The distance $\Delta_{PV}$ is larger than $\Delta_{PV}$, in particular, 2 mm larger.

In step 202 average attenuation values $\mu_{NC}$ and $\mu_{PC}$ are extracted from the areas NC and PC to allow a weighted contribution of the voxels within PV to the overall nodule volume.

The average attenuation value $\mu_{NC}$ is preferentially the arithmetic average value of all voxel values within the area NC. Alternatively, the average attenuation value $\mu_{NC}$ can be the median value of all voxel values within the area NC.

If the area NC is too small for determining a reliable average $\mu_{NC}$, i.e., for example, if the number of voxels within NC is smaller than 10, or if the area NC is so small, that it does not contain any voxel at all, the area NC can be increased such that it contains enough voxels to determine a reliable average $\mu_{NC}$, i.e., for example, that it contains more than 10 voxels. But, it is preferred, in this case, not to increase the area NC, but to use a predetermined voxel value which is typical for the segmented object. This predetermined voxel value can be determined empirically or by calibration. In this embodiment, the segmented object is a solid nodule in a CT image data set. Therefore, a predetermined typical density value for solid nodules can be used as $\mu_{NC}$.

The average attenuation value $\mu_{PC}$ is preferentially the arithmetic average value of all voxel values within the area PC. Alternatively, the average attenuation value $\mu_{PC}$ can be the median value of all voxel values within the area PC.

In step 203, to each voxel v within the VOI a weighting factor is assigned according to following equation:

$$w(v) := \begin{cases} 1: & v \in NC \\ \frac{i(v) - \mu_{PC}}{\mu_{NC} - \mu_{PC}}: & v \in PV \\ 0: & \text{otherwise,} \end{cases} \quad (12)$$

wherein i(v) denotes the density value of the voxel v in the VOI.

In step 204, the final nodule volume is determined by adding over all voxel weights within the VOI multiplied with the voxel volume. The resulting sum is the final voxel volume.

The method of determination of the volume of a segmented object terminates in step 205.

In another embodiment of a method of determination of the volume of a segmented object according to the invention, a weighting factor is assigned only to voxels within the areas NC and PV. And these weighting factors of the areas NC and PV are added and the resulting sum is multiplied with the volume of the VOI to achieve the voxel volume.

Figure 8:
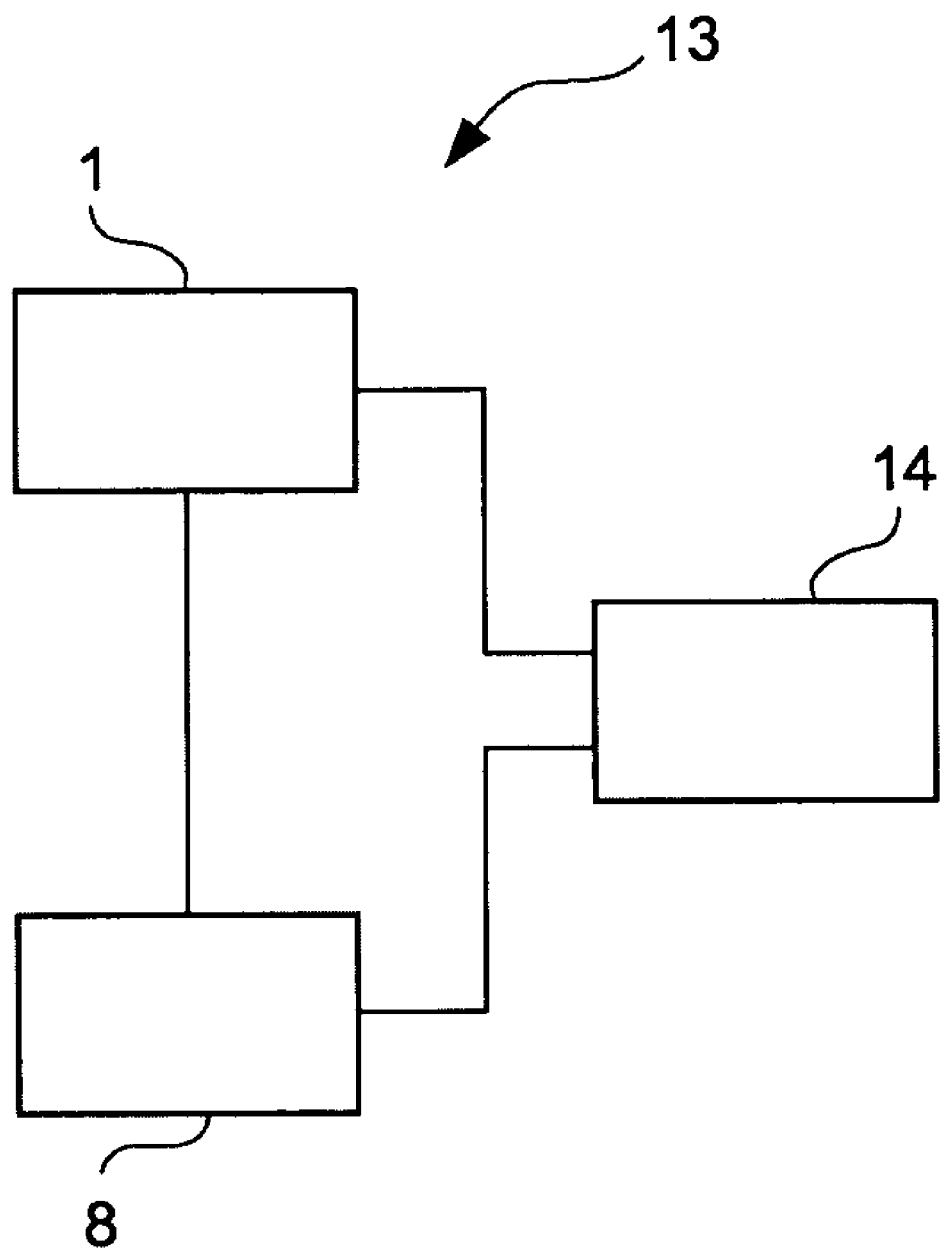
FIG. 8 shows a schematical view of an apparatus of segmenting an object in a data set and of determination of the volume of a segmented object.

In the following an apparatus 13 of segmenting an object in a data set and of determination of the volume of a segmented object will be described with reference to FIG. 8.

The apparatus 13 comprises an apparatus 1 of segmenting an object, which has been described above, and an apparatus 8 of determination of the volume of a segmented object, which has also been described above. The apparatuses 1 and 8 are preferentially controlled by a control means 14. The control means 14 can be connected to the control means 6, 12 of the apparatuses 1 and 8. Alternatively, one or both of the control means 6, 12 can be used, instead of the control means 14, to control the whole apparatus 13.

Figure 9:
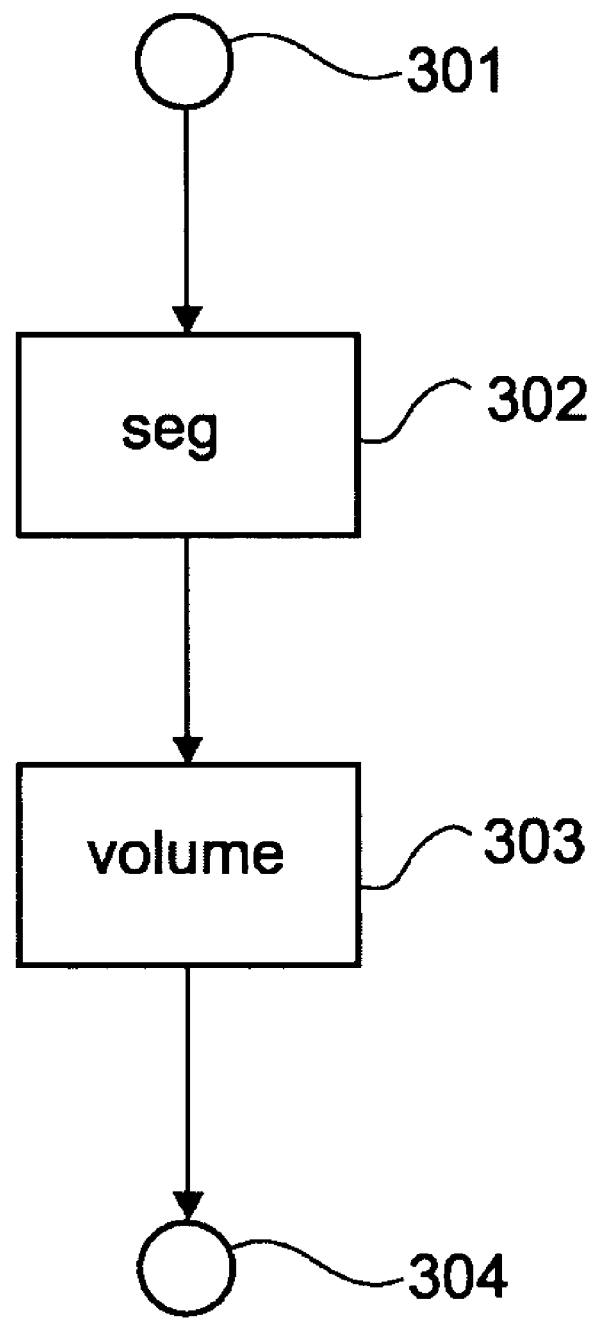
FIG. 9 shows a flowchart of a method of segmenting an object in a data set and of determination of the volume of a segmented object.

In the following a method of segmenting an object in a data set and of determination of the volume of a segmented object will be described with respect to FIG. 9.

Figure 3:
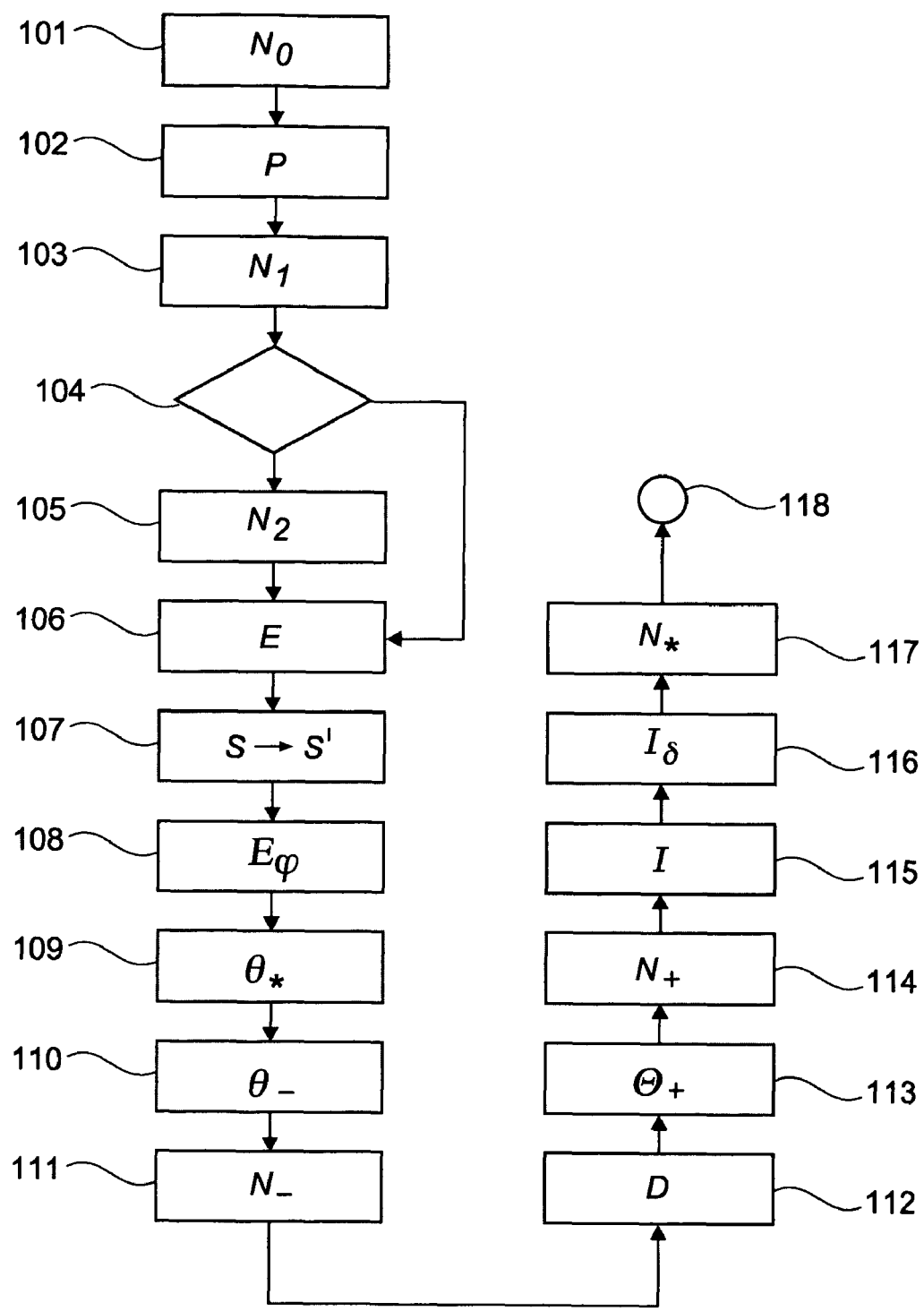
FIG. 3 shows a flowchart of a method of segmenting an object in a data set according to the invention.
Figure 4:
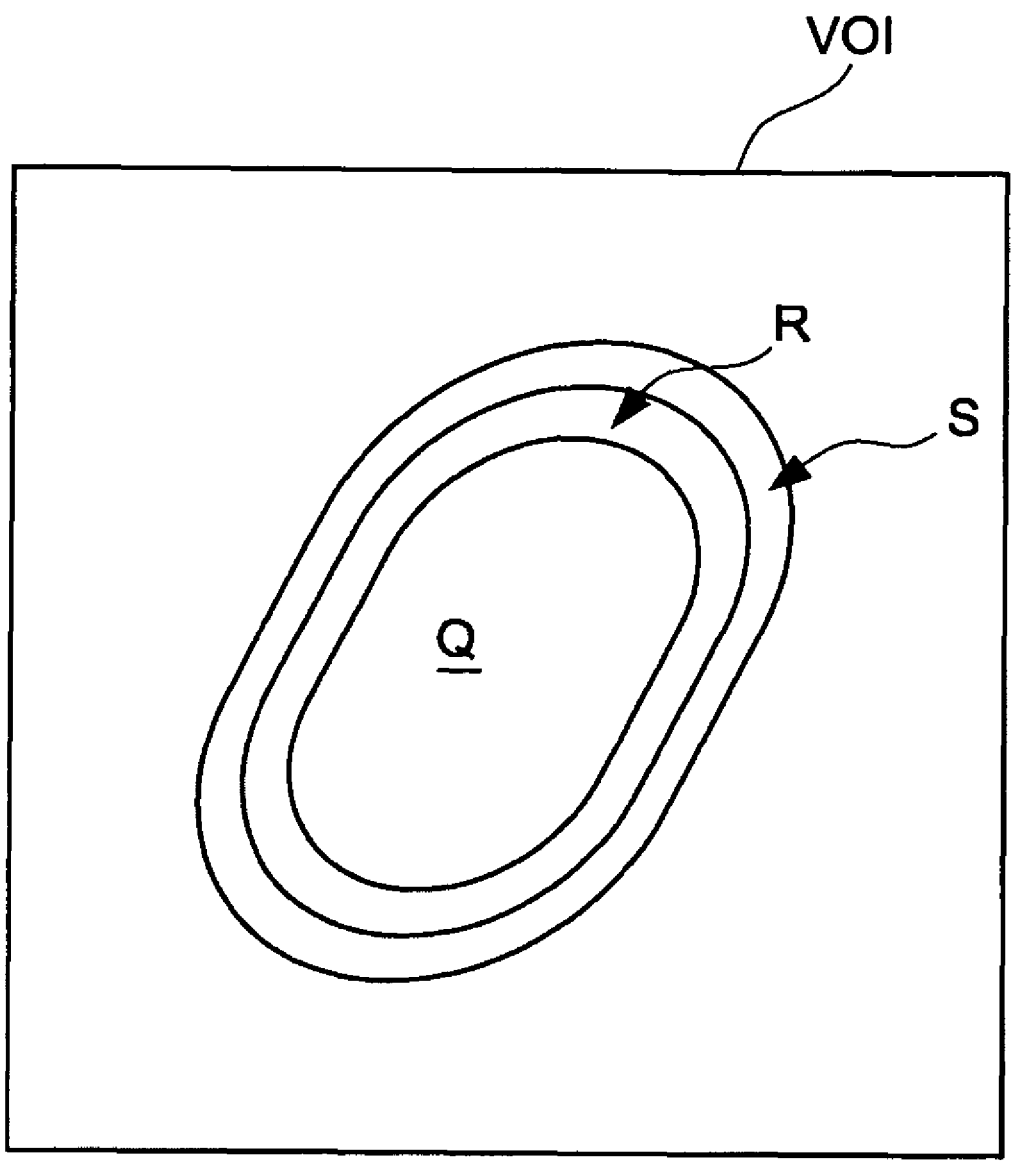
FIG. 4 shows a schematical view of a volume of interest comprising different sets of voxels.

After starting the method in step 301, in step 302 the object is segmented according to the steps 101 to 118 of FIG. 3 or step 101' to 108 and the corresponding description. Subsequently, in step 303, the volume of the segmented object is determined according to the steps 201 to 205 of FIG. 5 and the corresponding description. The method of segmenting an object in a data set and of determination of the volume of a segmented object terminates in step 304.

The invention is preferably integrated into an application prototype PulmoTREAT, which is, for instance, described in "New tools for computer assistance in thoracic CT—part II: Therapy monitoring of pulmonary metastases", L. Bornemann et al., RadioGraphics, vol. 25, no. 3, pp. 841-848, May 2005, using the research and development platform MeVisLab (www.mevislab.de, formerly known as ILab, which is, for example, described in "Concepts for rapid application prototyping in medical image analysis and visualization", H. K. Hahn et al., Proc. SimVis, March 2003, pp. 283-298).

One of the guiding principles in the development of the presented invention is clinical usefulness, where robust segmentation of complex nodules is not enough. The suitability for smooth integration into the clinical workflow is just as important, and touches the following aspects:

Firstly, speed: The general approach of solving the complex segmentation and quantification task according to the invention results in a very fast method where, for example, the complete procedure of segmentation and volumetry of a juxtapleural, vascularized nodule is performed within 0.2 seconds for a $32^3$-voxel volume of interest, and within 1.2 seconds for 643 voxels on a standard PC. This means that the average pulmonary nodule is analyzed without any significant waiting time.

Secondly, small as well as large lesions should be measurable robustly by the same tool. Our invention is preferentially specifically designed to work automatically also for larger metastases and additionally provides preferentially simple means for fast, interactive correction. Critical for the assessment of large lesions is not only the success of volumetry, but also whether it can be achieved within clinically acceptable time. A maximum computation time of about 4 seconds was measured on a standard PC for the largest metastasis, which had a volume of about 50 ml. Considering a clinician would otherwise have to go back to manually performing two-dimensional measurements in those cases, this represents a speedup as well as a substantial improvement in convenience and reproducibility.

Finally, a major constraint of using today's volumetric growth assessment methods in clinical practice is that, for reliable longitudinal comparison, both baseline and follow-up scan needed to be acquired using the exact same scanning and reconstruction settings. Since several months or even years lie typically between two examinations which are not necessarily performed by the same personnel, this is difficult to implement at most clinics. Both errors, systematic and non-systematic errors, caused by the common imaging protocol variations are substantially reduced by the methods according to the invention. Furthermore, the presented method of determination the volume of a segmented object according to the invention is able to compensate for linear volume averaging and is robust to Gaussian noise. In addition, the accuracy of the method of determination the volume of a segmented object according to the invention is substantially better than the one of the conventional method of summing up mask voxel volumes. This can be explained by the increased amount of volume averaging that is often inherent in a subset of the data, and which has a great influence on the conventional volumetry.

Any clinically significant volume change detectable using the two-dimensional RECIST criteria (change in diameter of more than +20% or −30%) is detected reliably by the methods according to the invention, in particular, on low dose CT data.

Furthermore, the methods according to the invention improve reproducibility for slice thickness and kernel variations. The improvements with respect to kernel and slice thickness variations are due to the fact that changes in these two parameters are directly associated with different amounts of volume averaging, which is precisely what the methods according to the invention are designed to compensate for. One of the main features of the segmentation is the automated determination of an optimal erosion strength for the morphological opening. In combination with a chest wall separation procedure, this allows for the robust segmentation not only of small spherical nodules, but also of other objects, in particular, of larger, irregularly shaped metastases extensively connected to lung surface and vasculature.

With their broad range of addressable objects, in particular target lesions, their high speed, and their robustness to imaging protocol variations, the presented methods according to the invention overcome essential drawbacks impeding the use of computer-assisted quantitative growth assessment in clinical routine examinations.

The methods according to the invention can be performed two-dimensionally or three-dimensionally, and the methods according to the invention can be performed in a two-dimensional or in a three-dimensional data set.

The methods according to the invention can be applied to any object in a data set. But it is preferred to apply the method according to the invention on lesions, like lung nodules, liver metastases, lymph nodes, in particular, enlarged lymph nodes, or brain metastases.

The invention claimed is:

1. A method of segmenting an object in a data set, said method comprising:
   a) initial segmenting of the object, resulting in a first set ($N_0$) of voxels,
   b) performing an erosion operation on the first set ($N_0$) of voxels resulting in an eroded set ($N_-$) of voxels,
   c) performing a dilation operation on the eroded set ($N_-$) of voxels resulting in a dilated set ($N_+$) of voxels, and
   wherein the erosion operation depends on a variable erosion threshold ($\Theta_-$) and
   wherein the dilation operation depends on a variable dilation threshold ($\Theta_+$).

2. The method according to claim 1, wherein the first set ($N_0$) of voxels comprises only connected voxels.

3. The method according to claim 1, wherein the erosion threshold ($\Theta_-$) and the dilation threshold ($\Theta_+$) depend on the first set ($N_0$) of voxels.

4. The method according to claim 1, wherein the first set ($N_0$) of voxels is modified, before performing the erosion operation, by:
   i) determining a complement of the first set ($N_0$) of voxels,
   ii) performing a connected component analysis on the complement of the first set ($N_0$) of voxels resulting in the largest connected non-segmented area (P), and
   iii) subtracting the largest connected non-segmented area (P) from the data set (V) resulting in a modified first set ($N_1$) of voxels.

5. The method according to claim 4, wherein, before the erosion operation and after subtracting the largest connected non-segmented area (P) from the data set (V), the method further includes:
   performing a convex hull operation on the largest connected non-segmented area (P) resulting in a convex set of voxels, and
   modifying the first set of voxels by intersecting the first set of voxels with the convex set of voxels wherein the intersection is the modified first set ($N_2$) of voxels.

6. The method according to claim 1,
   wherein the erosion threshold ($\Theta_-$) is determined depending on a first minimal distance ($E(v)$) of each of at least some voxels of the data set (V), in particular for the voxels of the first set ($N_0$; $N_1$; $N_2$), wherein the first minimal distance ($E(v)$) of each of at least some voxels of the data set (V) is the distance of the respective voxel of the at least some voxels of the data set (V) to a voxel outside of the first set ($N_0$; $N_1$; $N_2$) having the shortest distance to the respective voxel of the at least some voxels of the data set (V), and
   wherein the dilation threshold ($\Theta_+$) is determined depending on a second minimal distance ($D(v)$) of each of at least some voxels of the data set (V), wherein the second minimal distance ($D(v)$) of each of the at least some voxels of the data set (V) is the distance of each of the at least some voxels of the data set (V) to a voxel of the eroded set ($N_-$) of voxels having the shortest distance to the respective voxel of the at least some voxels of the data set (V).

7. The method according to claim 6, wherein the erosion threshold ($\Theta_-$) is determined by performing a first distance transformation to determine for each of at least some voxels of the data set (V) the first minimal distance (E(v)) resulting in a first distance map, determining a seed point (S') in the first set ($N_0; N_1; N_2$) of voxels being the position of a maximum, in particular a local maximum, in the first distance map, and determining the erosion threshold by performing a variable threshold region growing on the first distance map starting from the determined seed point (S') wherein the erosion threshold is equal to or larger than the highest threshold sufficient to reach the boundaries of the data set (V).

8. The method according to claim 6, wherein the erosion operation is performed such that the eroded set ($N_-$) of voxels comprises all voxels of the first set ($N_0; N_1; N_2$) of voxels whose first minimal distance (E(v)) is greater than or equal to the erosion threshold ($\Theta_-$).

9. The method according to claim 6, wherein, if the eroded set ($N_-$) of voxels comprises different voxel sets, which are separated from each other, one of these different voxel sets is selected by connected component analysis as the eroded set ($N_-$) of voxels.

10. The method according to claim 6, wherein the dilation operation comprises:

performing a second distance transformation to determine for each of at least some voxels of the data set (V) the second minimal distance (D(v)) resulting in a second distance map, and performing the dilation procedure such that the dilated set ($N_+$) of voxels includes all voxels whose second minimal distance (D(v)) to voxels of the eroded set ($N_-$) of voxels is smaller than the dilation threshold ($\Theta_+$).

11. The method according to claim 1, wherein the dilation threshold ($\Theta_+$) is determined such that the dilated set ($N_+$) of voxels comprises the same or more voxels than the first set ($N_0; N_1; N_2$) of voxels and/or that the dilation threshold ($\Theta_+$) is equal to or larger than the erosion threshold ($\Theta_-$).

12. The method according to claim 1, wherein, after the dilation operation, the method further includes:

determining the intersection of the boundary of the dilated set ($N_+$) of voxels with the first set ($N_0; N_1; N_2$) of voxels resulting in an intersected set of voxels, dilating the intersection by a tolerance summand ($\delta$) resulting in a dilated intersected set ($I_\delta$) of voxels, and subtracting the dilated intersected set ($I_\delta$) of voxels from the dilated set ($N_+$) of voxels.

13. The method according to claim 12, wherein, if the dilation threshold ($\Theta_+$) is larger than the erosion threshold ($\Theta_-$), the tolerance summand ($\delta$) is equal to the difference between the dilation threshold ($\Theta_+$) and the erosion threshold ($\Theta_-$).

14. The method according to claim 1, wherein, if the dilated set of voxels is surrounded by a rim of voxels, wherein the absolute difference between voxel values of the rim of voxels and voxel values of voxels of the dilated set of voxels located in the vicinity of the rim of voxels is larger than a predetermined difference value, the voxel values of the rim are set to a value having a absolute difference to the voxel values of the dilated set of voxels located in the vicinity of the rim of the voxels which is smaller than the predetermined difference value.

15. The method according to claim 1, wherein the initial segmenting of the object resulting in a first set ($N_0$) of voxels comprises:

providing a volume of interest inside the data set, determining an object value from values in the center of the volume of interest, determining a non-object value from the value of the volume of interest or providing a predetermined non-object value, determining lower and upper thresholds depending on a relation between the object value and the non-object value, and performing a region growing procedure starting from a predetermined seed point with the determined lower and upper thresholds resulting in a first set of voxels.

16. The method according to claim 15, wherein the object value is an average value of values located in the center.

17. The method according to claim 15, wherein the non-object value is determined as the value within the volume of interest comprising the largest frequency of occurrence.

18. The method according to claim 15, wherein the lower and upper thresholds are determined such that, the lower threshold is the smallest voxel value within the volume of interest and the upper threshold is the average of the object value and the non-object value, if the object value is smaller than all values within a predetermined interval surrounding the non-object value, the lower threshold is the average of the object value and the non-object value and the upper threshold is the largest voxel value within the volume of interest, if the object value is larger than all values within a predetermined interval surrounding the non-object value, and the lower threshold and the upper threshold within a margin around the non-object value, wherein the margin is determined such that less than a predetermined fraction of the volume of interest is located within the margin, if the object value is located within the predetermined interval surrounding the non-object value.

19. The method according to claim 1, wherein, before performing an initial segmentation of the object as set forth in element (a) above, an initial segmentation of the object is performed, resulting in an initial set of voxels, a first neighboring set of voxels is defined, wherein the voxels of the initial set of voxels are located within a first predetermined voxel distance from the initial set of voxels, a second neighboring set of voxels is defined, wherein the voxels of the second neighboring set of voxels are located within a second predetermined voxel distance from the first neighboring set of voxels, and if the difference between a first average of the voxels of the first neighboring set of voxels and an second average of the second neighboring set of voxels is larger than a predetermined first fraction of the first average and if the first average is larger than a third average of the initial set of voxels and if the first average is larger than the second average, to each of the voxels of the initial set of voxels a value is assigned such that a predetermined second fraction of voxel values of the first neighboring set of voxels is smaller than the assigned value of the voxels of the first set of voxels, wherein the values within the volume of interest are modified.

20. The method according to claim 1, wherein performing an erosion operation on the first set ($N_0$) of voxels and performing a dilation operation on the eroded set ($N_{31}$) of voxels are performed several times with different predetermined erosion thresholds ($\Theta_-$).

21. The method according to claim 1, wherein the erosion operation is performed using a predetermined erosion threshold ($\Theta_-$) and the dilation operation is performed according to claim 11 or 10.

22. An apparatus for segmenting an object in a data set for carrying out the method according to claim 1, said apparatus comprising:
- initial segmenting means for initial segmenting of the object, resulting in a first set ($N_0$; $N_1$; $N_2$) of voxels,
- erosion means for performing an erosion operation on the first set ($N_0$; $N_1$; $N_2$) of voxels resulting in an eroded set ($N_-$) of voxels, and
- dilation means for performing a dilation operation on the eroded set ($N_-$) of voxels resulting in a dilated set ($N_+$) of voxels, and
- wherein the erosion operation depends on a variable erosion threshold ($\Theta_-$) and wherein the dilation operation depends on a variable dilation threshold ($\Theta_+$).

23. An apparatus for segmenting an object in a data set and of determination of the volume of a segmented object, wherein the apparatus comprises an apparatus of segmenting an object according to claim 22 and an apparatus of determination of the volume of a segmented object comprising:
- defining means,
  - for defining an inner set (NC) of voxels comprising voxels arranged inside the segmented object and having a distance from a boundary of the segmented object which is larger than a predetermined minimum distance, wherein, if such voxels do not exist, the inner set (NC) of voxels is a zero set of voxels,
  - for defining an outer set (PC) of voxels comprising voxels arranged outside the segmented object and having a distance from the boundary of the segmented object which is larger than the predetermined minimum distance, and
  - for defining a middle set (PV) of voxels comprising voxels which are not included in the inner (NC) or outer set (PC) of voxels;
- assigning means
  - for assigning to each voxel of the inner set (NC) of voxels the same weighting factor (w(v)), in particular one, and
  - for assigning to each voxel of the middle set (PV) of voxels a weighting factor (w(v)) which depends on the position and/or the value of the respective voxel within the middle set (PV) of voxels and/or the values of the voxels in the inner voxel and outer set (PC) of voxels; and
- determining means for determining the volume of the segmented object, wherein the determining means is adapted to add the weighting factors assigned to the voxels of the middle set (PV) of voxels and, if the inner set (NC) of voxel is not a zero set of voxels, of the inner set (NC) of voxels.

24. A computer program embodied on a non-transitory computer-readable medium for segmenting an object in a data set for carrying out the method of claim 1, when the computer program is run on a computer, comprising:
- first program code for initial segmenting of the object, resulting in a first set ($N_0$; $N_1$; $N_2$) of voxels,
- second program code for performing an erosion operation on the first set ($N_0$) of voxels resulting in an eroded set ($N_-$) of voxels, and
- third program code for performing an dilation operation on the eroded set ($N_-$) of voxels resulting in a dilated set ($N_+$) of voxels, and
- wherein the erosion operation depends on a variable erosion threshold ($\Theta_-$) and wherein the dilation operation depends on a variable dilation threshold ($\Theta_+$).

25. A method of segmenting an object in a data set, said method comprising:
a) initial segmenting of the object, resulting in a first set ($N_0$) of voxels,
b) modifying the first set ($N_0$) of voxels by:
   - determining a complement of the first set ($N_0$) of voxels,
   - performing a connected component analysis on the complement of the first set ($N_0$) of voxels resulting in the largest connected non-segmented area (P), and
   - subtracting the largest connected non-segmented area (P) from the data set (V) resulting in a modified first set ($N_1$) of voxels,
c) performing a first distance transformation to determine for each of at least some voxels of the data set (V) the first minimal distance (E(v)) resulting in a first distance map, wherein the first minimal distance of each of at least some voxels of the data set (V) is the distance of the respective voxel of the at least some voxels of the data set (V) to a voxel outside of the first set ($N_1$) having the shortest distance to the respective voxel of the at least some voxels of the data set (V),
d) determining a seed point (S') in the first set ($N_1$) of voxels being the position of a maximum, in particular of a local maximum, in the first distance map,
e) determining an erosion threshold ($\Theta_-$) by performing a variable threshold region growing on the first distance map starting from the determined seed point (S') wherein the erosion threshold ($\Theta_-$) is equal to or larger than the highest threshold sufficient to reach the boundaries of the data set (V),
f) performing an erosion operation on the first set ($N_1$) of voxels resulting in an eroded set ($N_-$) of voxels, wherein the erosion operation is performed such that the eroded set ($N_-$) of voxels comprises all voxels of the first set ($N_1$) of voxels whose first minimal distance is smaller than or equal to the erosion threshold ($\Theta_-$),
g) performing a second distance transformation to determine for each of at least some voxels of the data set (V) the second minimal distance (D(v)), wherein the second minimal distance (D(v)) of each of the at least some voxels of the data set (V) is the distance of each of the at least some voxels of the data set (V) to a voxel of the eroded set ($N_-$) of voxels having the shortest distance to the respective voxel of the at least some voxels of the data set (V), and
h) performing a dilation operation on the eroded set ($N_-$) of voxels resulting in a dilated set ($N_+$) of voxels such that the dilated set ($N_+$) of voxels includes all voxels whose second minimal distance (D(v)) to voxels of the eroded set ($N_-$) of voxels is smaller than the dilation threshold ($\Theta_+$), wherein the dilation threshold ($\Theta_+$) is defined such that the dilated set ($N_+$) of voxels comprises the same or more voxels than the first set ($N_1$) of voxels and/or that the dilation threshold ($\Theta_+$) is equal to or larger than the erosion threshold ($\Theta_-$).

26. The method according to claim 25, wherein, after the dilation operation, the method further comprises:
- determining the intersection of the boundary of the dilated set ($N_+$) of voxels with the first set ($N_1$) of voxels resulting in an intersected set of voxels,
- dilating the intersection by a tolerance summand resulting in a dilated intersected set of voxels, and
- subtracting the dilated intersected set of voxels from the dilated set ($N_+$) of voxels.

27. The method according to claim 26, wherein, if the dilation threshold ($\Theta_+$ is larger than the erosion threshold ($\Theta_-$), the tolerance summand is equal to the difference between the dilation threshold ($\Theta_+$) and the erosion threshold ($\Theta_-$).

28. A method of segmenting an object in a data set, said method comprising:

a) initial segmenting of the object, resulting in a first set ($N_0$) of voxels,
b) modifying the first set ($N_0$) of voxels by:
determining a complement of the first set ($N_0$) of voxels,
performing a connected component analysis on the complement of the first set ($N_0$) of voxels resulting in the largest connected non-segmented area (P), and
subtracting the largest connected non-segmented area (P) from the data set (V) resulting in a modified first set ($N_1$) of voxels,
c) performing a convex hull operation on the largest connected non-segmented area (P) resulting in a convex set of voxels,
d) modifying the first set of voxels by intersecting the first set of voxels with the convex set of voxels wherein the intersection is the modified first set ($N_2$) of voxels,
e) performing a first distance transformation to determine for each of at least some voxels of the data set (V) the first minimal distance (E(v)) resulting in a first distance map, wherein the first minimal distance (E(v)) of each of at least some voxels of the data set (V) is the distance of the respective voxel of the at least some voxels of the data set (V) to a voxel outside of the first set ($N_2$) having the shortest distance to the respective voxel of the at least some voxels of the data set (V),
f) determining a seed point (S') in the first set ($N_2$) of voxels being the position of the maximum in the first distance map,
g) determining an erosion threshold ($\Theta_-$) by performing a variable threshold region growing on the first distance map starting from the determined seed point (S') wherein the erosion threshold ($\Theta_-$) is equal to or larger than the highest threshold sufficient to reach the boundaries of the data set (V),
h) performing an erosion operation on the first set ($N_2$) of voxels resulting in an eroded set ($N_-$) of voxels, wherein the erosion operation is performed such that the eroded set ($N_-$) of voxels comprises all voxels of the first set ($N_2$) of voxels whose first minimal distance is smaller than or equal to the erosion threshold ($\Theta_-$),
i) performing a second distance transformation to determine for each of at least some voxels of the data set (V) the second minimal distance (D(v)) wherein the second minimal distance (D(v)) of each of the at least some voxels of the data set (V) is the distance of each of the at least some voxels of the data set (V) to a voxel of the eroded set ($N_-$) of voxels having the shortest distance to the respective voxel of the at least some voxels of the data set (V), and
j) performing an dilation operation on the eroded set ($N_-$) of voxels resulting in a dilated set ($N_+$) of voxels such that the dilated set ($N_+$) of voxels includes all voxels whose second minimal distance (D(v)) to voxels of the eroded set ($N_-$) of voxels is smaller than the dilation threshold ($\Theta_+$), wherein the dilation threshold ($\Theta_+$) is defined such that the dilated set ($N_+$) of voxels comprises the same or more voxels than the first set ($N_2$) of voxels and/or that the dilation threshold ($\Theta_+$) is equal to or larger than the erosion threshold ($\Theta_-$).

29. The method according to claim 28, wherein, after the dilation operation, the method further comprises:
determining the intersection (I) of the boundary of the dilated set ($N_+$) of voxels with the first set ($N_2$) of voxels resulting in an intersected set of voxels,
dilating the intersection (I) by a tolerance summand ($\delta$) resulting in a dilated intersected set ($I_\delta$) of voxels, and
subtracting the dilated intersected (I) set of voxels from the dilated set ($N_+$) of voxels.

30. The method according to claim 28 or claim 29, wherein, if the dilation threshold ($\Theta_+$) is larger than the erosion threshold ($\Theta_-$), the tolerance summand ($\delta$) is equal to the difference between the dilation threshold ($\Theta_+$) and the erosion threshold ($\Theta_-$).

31. A method for determination of the volume of a segmented object, in particular a lesion, in a data set, said method comprising:
defining an inner set (NC) of voxels comprising voxels arranged inside the segmented object and having a distance from the boundary of the segmented object which is larger than a predetermined minimum distance, wherein, if such voxels do not exist, the inner set (NC) of voxels is a zero set of voxels,
defining an outer set (PC) of voxels comprising voxels arranged outside the segmented object and having a distance from the boundary of the segmented object which is larger than the predetermined minimum distance,
defining a middle set (PV) of voxels comprising voxels which are not included in the inner (NC) or outer set (PC) of voxels,
assigning to each voxel of the inner set (NC) of voxels the same weighting factor, in particular one, if the inner set (NC) of voxels is not a zero set of voxels,
assigning to each voxel of the middle set (PV) of voxels a weighting factor (w(v)) which depends on the position and/or the value of the respective voxel within the middle set (PV) of voxels and/or the values of the voxels in the inner (NC) and outer set (PC) of voxels, and
determining the volume of the segmented object, wherein the weighting factors (w(v)) assigned to the voxels of the middle set (PV) of voxels and, if the inner set (NC) of voxels is not a zero set of voxels, of the inner set (NC) of voxels are added.

32. The method according to claim 31, wherein an inner average voxel value ($\mu_{NC}$) is determined for the inner set (NC) of voxels, if the inner set (NC) of voxels is not a zero set of voxels, wherein an outer average voxel value ($\mu_{PC}$) is determined for the outer set (PC) of voxels and wherein the weighting factors assigned to the voxels of the middle set (PV) of voxels depend on the ratio of the difference between the voxel value of the respective voxel of the middle set (PV) of voxels and the outer average voxel ($\mu_{PC}$) value to the difference between the inner average voxel value ($\mu_{NC}$) and the outer average voxel value ($\mu_{PC}$).

33. The method according to claim 31, wherein, if the inner set (NC) of voxels is a zero set of voxels, an outer average voxel value is determined for the outer set (PC) of voxels and wherein the weighting factors assigned to the voxels of the middle set (PV) of voxels depend on the ratio of the difference between the voxel value of the respective voxel of the middle set (PV) of voxels and the outer average voxel ($\mu_{PC}$) value to the difference between the predetermined inner average voxel value ($\mu_{NC}$) and the outer average voxel value ($\mu_{PC}$).

34. The method according to claim 31, wherein the segmented object has been segmented by:
initial segmenting of the object, resulting in a first set ($N_0$) of voxels,
performing an erosion operation on the first set ($N_0$) of voxels resulting in an eroded set ($N_-$) of voxels,
performing a dilation operation on the eroded set ($N_-$) of voxels resulting in a dilated set ($N_+$) of voxels, and wherein the erosion operation depends on a variable erosion threshold ($\Theta_-$) and the dilation operation depends on a variable dilation threshold ($\Theta_+$).

35. The method according to claim 31, wherein the segmented object has been segmented by:
   initial segmenting of the object, resulting in a first set ($N_0$) of voxels,
   performing an erosion operation on the first set ($N_0$) of voxels resulting in an eroded set ($N_-$) of voxels,
   performing a dilation operation on the eroded set ($N_-$) of voxels resulting in a dilated set ($N_+$) of voxels, and
   wherein the erosion operation depends on a variable erosion threshold ($\Theta_-$) and the dilation operation depends on a variable dilation threshold ($\Theta_+$); and
      wherein, after the dilation operation, the method further includes:
   determining the intersection of the boundary of the dilated set ($N_+$) of voxels with the first set ($N_0$; $N_1$; $N_2$) of voxels resulting in an intersected set of voxels,
   dilating the intersection by a tolerance summand ($\delta$) resulting in a dilated intersected set ($I_\delta$) of voxels, and
   subtracting the dilated intersected set ($I_\delta$) of voxels from the dilated set ($N_+$) of voxels; and
   wherein the inner (NC), middle (PV) and outer set (PC) of voxels do not comprise voxels which are in the dilated intersected set ($I_\delta$) of voxels.

36. The method according to claim 31, wherein the segmented object has been segmented by:
   initial segmenting of the object, resulting in a first set ($N_0$) of voxels,
   performing an erosion operation on the first set ($N_0$) of voxels resulting in an eroded set ($N_-$) of voxels,
   performing a dilation operation on the eroded set ($N_-$) of voxels resulting in a dilated set ($N_+$) of voxels, and
   wherein the erosion operation depends on a variable erosion threshold ($\Theta_-$) and the dilation operation depends on a variable dilation threshold ($\Theta_+$); and
      wherein the first set ($N_0$) of voxels is modified, before performing the erosion operation, by:
   i) determining a complement of the first set ($N_0$) of voxels,
   ii) performing a connected component analysis on the complement of the first set ($N_0$) of voxels resulting in the largest connected non-segmented area (P), and
   iii) subtracting the largest connected non-segmented area (P) from the data set (V) resulting in a modified first set ($N_1$) of voxels; and
   wherein the inner (NC), middle (PV) and outer sets (PC) only comprise voxels located outside the convex set of voxels.

37. A method of segmenting an object in a data set and of determination of the volume of a segmented object, wherein the object is segmented by:
   initial segmenting of the object, resulting in a first set ($N_0$) of voxels,
   performing an erosion operation on the first set ($N_0$) of voxels resulting in an eroded set ($N_-$) of voxels,
   performing a dilation operation on the eroded set ($N_-$) of voxels resulting in a dilated set ($N_+$) of voxels, and
   wherein the erosion operation depends on a variable erosion threshold ($\Theta_-$) and the dilation operation depends on a variable dilation threshold ($\Theta_+$) thereby yielding a segmented object; and
   wherein the volume of the segmented object is determined according to claim 31.

38. A computer program embodied on a non-transitory computer-readable medium for segmenting an object in a data set and of determination of the volume of a segmented object for carrying out the method of claim 37, when the computer program is run on a computer, comprising the computer program code of the computer program of segmenting an object in a data set by first program code for initial segmenting of the object, resulting in a first set ($N_0$; $N_1$; $N_2$) of voxels, second program code for performing an erosion operation on the first set (N0) of voxels resulting in an eroded set ($N_-$) of voxels and third program code for performing a dilation operation on the eroded set ($N_-$) of voxels resulting in a dilated set ($N_+$) of voxels, and wherein the erosion operation depends on a variable erosion threshold ($\Theta_-$) and wherein the dilation operation depends on a variable dilation threshold ($\Theta_+$) and the computer program code of the computer program of determination of the volume of a segmented object of first program code for defining an inner set (NC) of voxels comprising voxels arranged inside the segmented object and having a distance from the boundary of the segmented object which is larger than a predetermined minimum distance, second program code for defining an outer set (PC) of voxels comprising voxels arranged outside the segmented object and having a distance from the boundary of the segmented object which is larger than the predetermined minimum distance, third program code for defining a middle set (PV) of voxels comprising voxels which are not included in the inner (NC) or outer set (PC) of voxels, fourth program code for assigning to each voxel of the inner set (NC) of voxels the same weighting factor (w(v)), in particular one, if the inner set (PC) of voxels is not a zero set of voxels, fifth program code for assigning to each voxel of the middle set (PV) of voxels a weighting factor (w(v)) which depends on the position and/or the value of the respective voxel within the middle set (PV) of voxels and/or the values of the voxels in the inner (NC) and outer set (PC) of voxels, and sixth program code for determining the volume of the segmented object, wherein the weighting factors (w(v)) assigned to the voxels of the middle set (PV) of voxels and, if the inner set (PC) of voxels is not a zero set of voxels, of the inner set (PC) of voxels are added.

39. An apparatus for determination of the volume of a segmented object, in particular a lesion, in a data set, said apparatus comprising:
   defining means,
      for defining an inner set (NC) of voxels comprising voxels arranged inside the segmented object and having a distance from a boundary of the segmented object which is larger than a predetermined minimum distance, wherein, if such voxels do not exist, the inner set (NC) of voxels is a zero set of voxels,
      for defining an outer set (PC) of voxels comprising voxels arranged outside the segmented object and having a distance from the boundary of the segmented object which is larger than the predetermined minimum distance, and
      for defining a middle set (PV) of voxels comprising voxels which are not included in the inner (NC) or outer set (PC) of voxels;
   assigning means
      for assigning to each voxel of the inner set (NC) of voxels the same weighting factor (w(v)), in particular one, and
      for assigning to each voxel of the middle set (PV) of voxels a weighting factor (w(v)) which depends on the position and/or the value of the respective voxel within the middle set (PV) of voxels and/or the values of the voxels in the inner voxel and outer set (PC) of voxels; and
   determining means for determining the volume of the segmented object, wherein the determining means is adapted to add the weighting factors assigned to the voxels of the middle set (PV) of voxels and, if the inner set (NC) of voxel is not a zero set of voxels, of the inner set (NC) of voxels.

40. A computer program embodied on a non-transitory computer-readable medium for determination of the volume of a segmented object, in particular a lesion, in a data set for carrying out the method of claim 31, when the computer program is run on a computer, comprising:
- first program code for defining an inner set (NC) of voxels comprising voxels arranged inside the segmented object and having a distance from the boundary of the segmented object which is larger than a predetermined minimum distance,
- second program code for defining an outer set (PC) of voxels comprising voxels arranged outside the segmented object and having a distance from the boundary of the segmented object which is larger than the predetermined minimum distance,
- third program code for defining a middle set (PV) of voxels comprising voxels which are not included in the inner (NC) or outer set (PC) of voxels,
- fourth program code for assigning to each voxel of the inner set (NC) of voxels the same weighting factor (w(v)), in particular one, if the inner set (PC) of voxels is not a zero set of voxels,
- fifth program code for assigning to each voxel of the middle set (PV) of voxels a weighting factor (w(v)) which depends on the position and/or the value of the respective voxel within the middle set (PV) of voxels and/or the values of the voxels in the inner (NC) and outer set (PC) of voxels, and
- sixth program code for determining the volume of the segmented object, wherein the weighting factors (w(v)) assigned to the voxels of the middle set (PV) of voxels and, if the inner set (PC) of voxels is not a zero set of voxels, of the inner set (PC) of voxels are added.

* * * * *

UNITED STATES PATENT AND TRADEMARK OFFICE
CERTIFICATE OF CORRECTION

PATENT NO. : 7,760,941 B2  Page 1 of 1
APPLICATION NO. : 11/503337
DATED : July 20, 2010
INVENTOR(S) : Bornemann et al.

It is certified that error appears in the above-identified patent and that said Letters Patent is hereby corrected as shown below:

In the Claims:

Col. 32, line 61 (claim 20), "$(N_{31})$" should be -- $(N_-)$ --.

Col. 34, line 62 (claim 27), "$(\Theta_+$ is" should be -- $(\Theta_+)$ is --.

Signed and Sealed this

Fourteenth Day of September, 2010

David J. Kappos
*Director of the United States Patent and Trademark Office*